United States Patent [19]
Burger et al.

[11] Patent Number: 6,044,666
[45] Date of Patent: Apr. 4, 2000

[54] INSULATING FLOW AND BUSHING BLOCKS, BUSHING ASSEMBLIES, FIBER FORMING APPARATUS AND METHOD FOR FORMING FIBERS

[75] Inventors: Gerard J. Burger, Hoogezand, Netherlands; Dennis S. Postupack, Natrona Heights, Pa.; Robert A. Roach, Allison Park, Pa.; James W. Koewing, Murrysville, Pa.

[73] Assignee: PPG Industries Ohio, Inc., Cleveland, Ohio

[21] Appl. No.: 09/076,281

[22] Filed: May 12, 1998

[51] Int. Cl.[7] .................................................. C03B 37/08
[52] U.S. Cl. ......................... 65/492; 65/326; 65/374.13; 65/495; 425/66
[58] Field of Search ............................... 65/326, 374.13, 65/483, 492, 495; 425/6, 66

[56] References Cited

U.S. PATENT DOCUMENTS

| | | |
|---|---|---|
| 1,796,571 | 3/1931 | Mathieu . |
| 3,249,669 | 5/1966 | Jamieson ............................ 264/177.13 |
| 3,532,479 | 10/1970 | Stalego ....................................... 65/16 |
| 3,558,296 | 1/1971 | Bracken ................................... 65/326 |
| 3,726,655 | 4/1973 | Mitcham et al. ............................. 65/1 |
| 3,837,823 | 9/1974 | Shealy .......................................... 65/1 |
| 3,985,530 | 10/1976 | Hynd ............................................ 65/1 |
| 3,988,135 | 10/1976 | Coggin, Jr. ................................... 65/1 |
| 4,155,731 | 5/1979 | Byrnes et al. ............................. 65/492 |
| 4,161,396 | 7/1979 | Greene et al. ................................ 65/1 |
| 4,249,398 | 2/1981 | Greene et al. ................................ 65/1 |
| 4,264,348 | 4/1981 | Sullivan ....................................... 65/1 |
| 4,270,941 | 6/1981 | Babbit ......................................... 65/1 |
| 4,436,541 | 3/1984 | Pellegrin et al. ......................... 65/476 |
| 4,488,891 | 12/1984 | Grubka et al. ............................ 65/476 |
| 4,525,188 | 6/1985 | Jensen ...................................... 65/380 |
| 4,544,392 | 10/1985 | Sheinkop ...................................... 65/1 |
| 4,591,371 | 5/1986 | Schaefer ................................ 65/326 X |
| 4,612,027 | 9/1986 | Marra ....................................... 65/471 |
| 4,624,693 | 11/1986 | Marra et al. ............................. 65/471 |
| 4,664,688 | 5/1987 | Grubka et al. ........................... 65/471 |
| 4,676,813 | 6/1987 | Hanna et al. ............................. 65/476 |
| 4,704,150 | 11/1987 | McEarthron ................................. 65/1 |
| 4,819,247 | 4/1989 | Seng et al. ............................... 373/30 |
| 5,106,795 | 4/1992 | Drake et al. ............................ 501/126 |
| 5,709,727 | 1/1998 | Bobba ...................................... 65/481 |

FOREIGN PATENT DOCUMENTS 990697  1/1983  U.S.S.R. .

OTHER PUBLICATIONS

G. A. Korn and T. M. Korn, *Mathematical Handbook for Scientists and Engineers*, (2nd Ed., 1968), pp. 881–884. (No Month Available).

K. L. Loewenstein, *The Manufacturing Technology of Glass Fibres*, (3rd. Ed. 1993) pp. 31–36, 122–126, 175–194, 237–289. (No Month Available).

*Encyclopedia of Polymer Science and Technology*, vol. 6 pp. 505–712. (No Date).

*Primary Examiner*—Sean Vincent
*Attorney, Agent, or Firm*—Anne Marie Cannoni; Andrew C. Siminerio

[57] ABSTRACT

An insulating flow block having a plurality of bores extending therethrough to permit the flow of molten fiberizable material through the block, a bushing assembly having a bushing block with one or more bores extending through a peripheral region thereof to divert a portion of a supply of molten fiberizable material from a central region of the bushing block to the peripheral region of the bushing block, and a bushing positioned in general registry with the bore of the peripheral region of the bushing block to facilitate the flow of molten fiberizable material to a peripheral region of the bushing is disclosed.

28 Claims, 12 Drawing Sheets

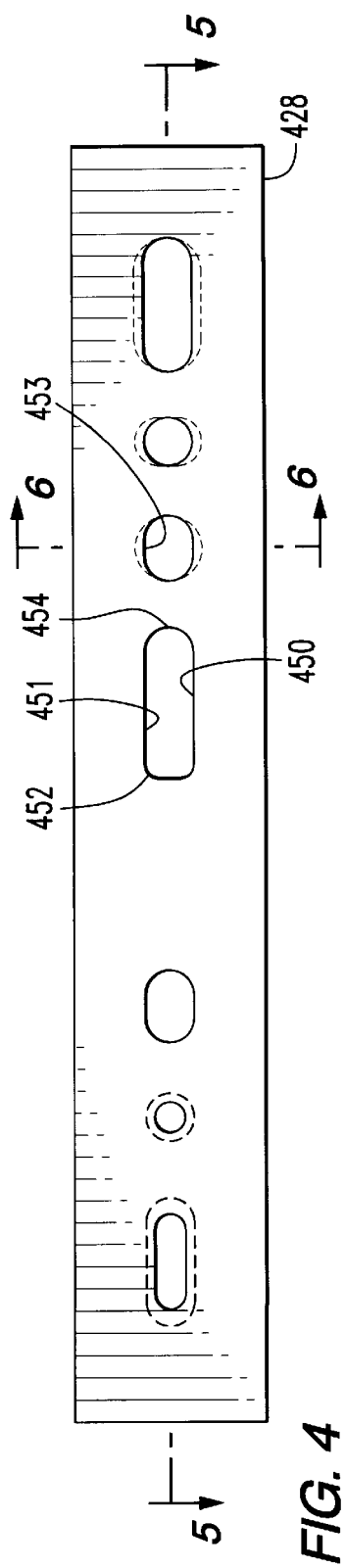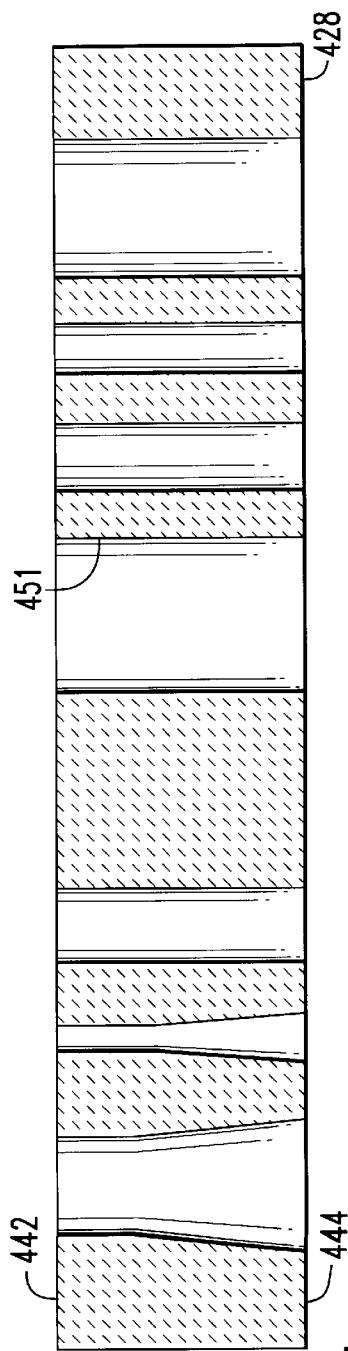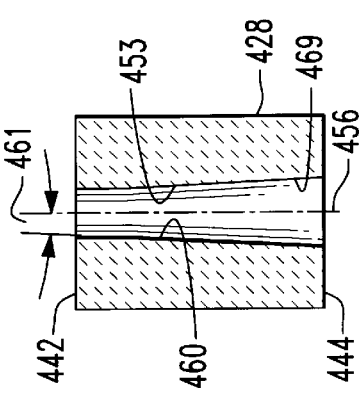
FIG. 4
FIG. 5
FIG. 6

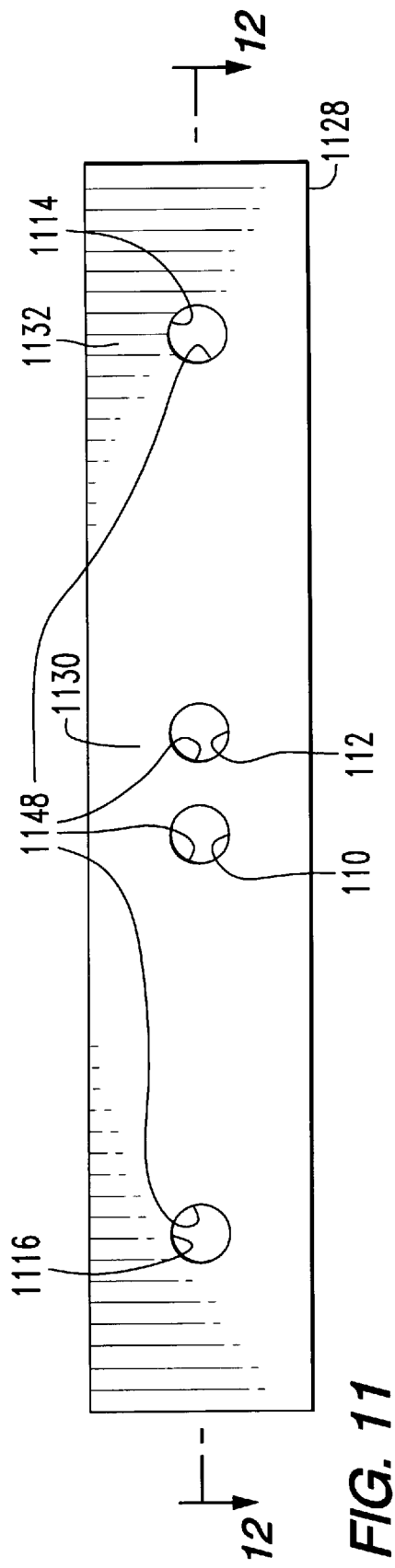
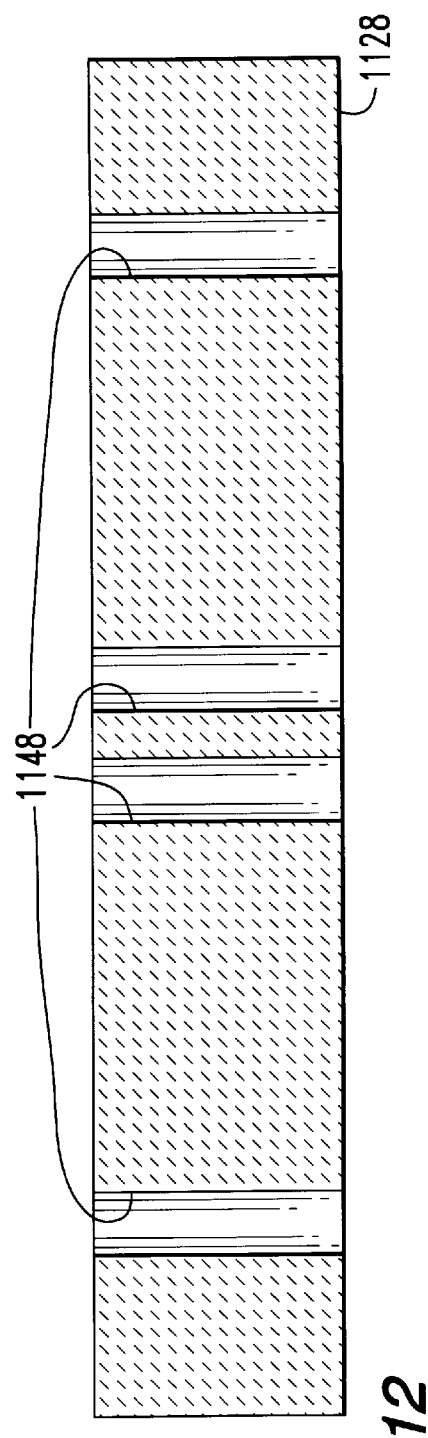
FIG. 11
FIG. 12

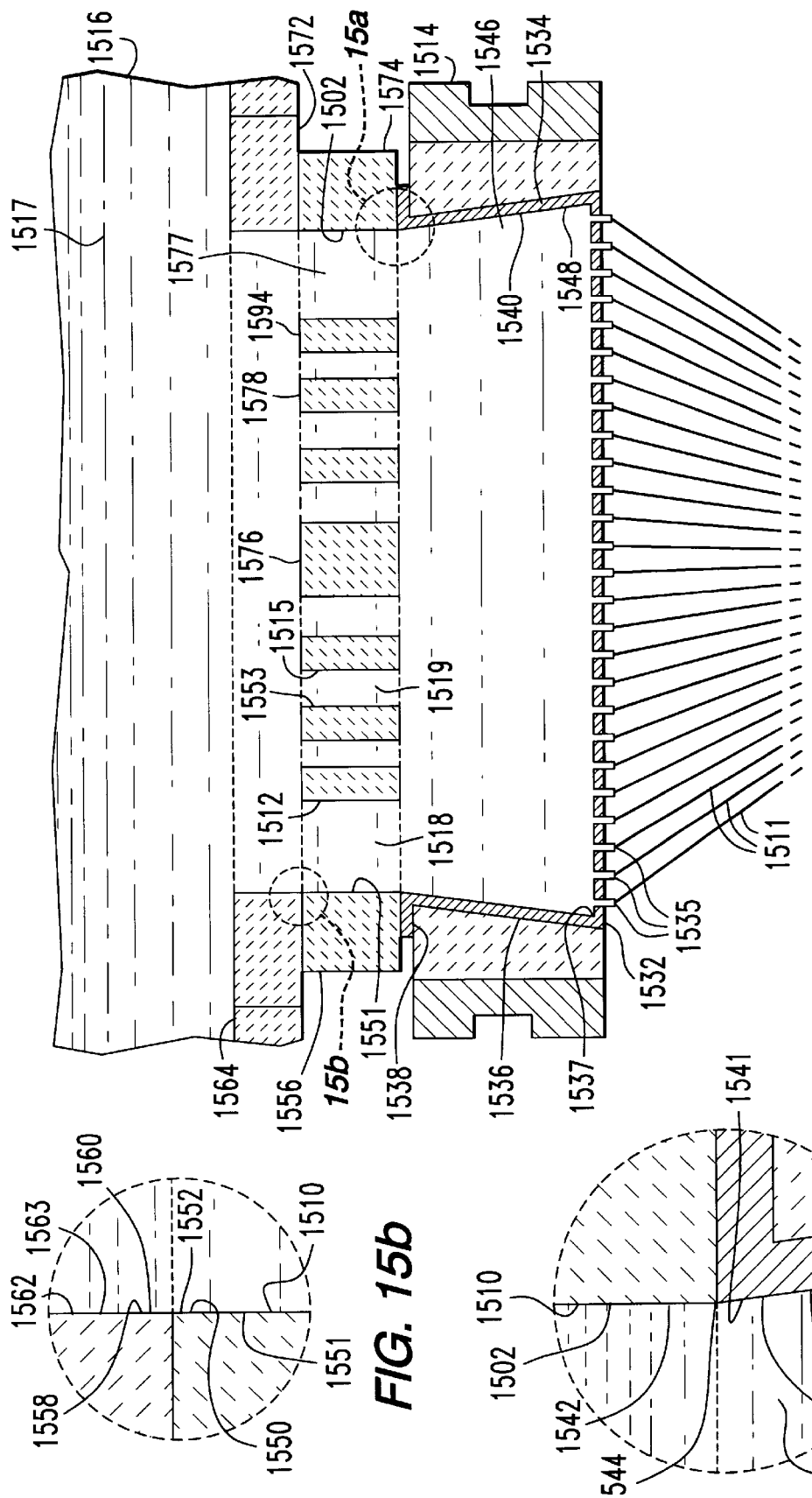

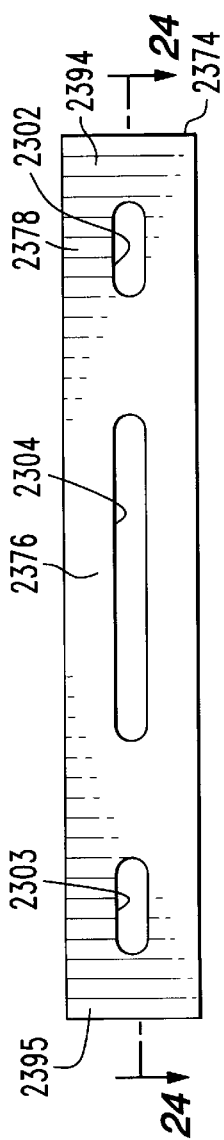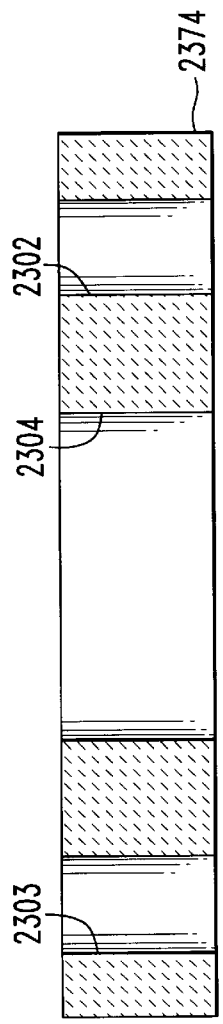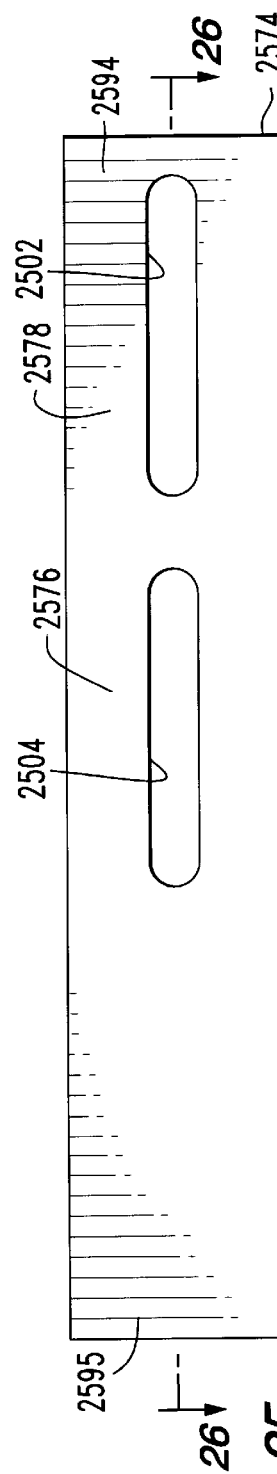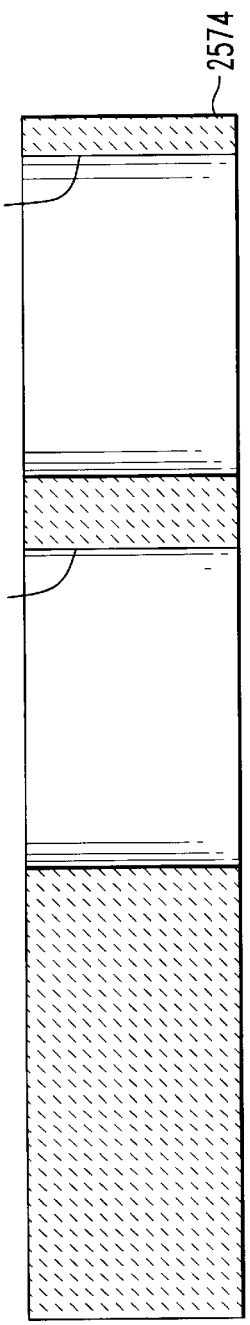

INSULATING FLOW AND BUSHING BLOCKS, BUSHING ASSEMBLIES, FIBER FORMING APPARATUS AND METHOD FOR FORMING FIBERS

FIELD OF THE INVENTION

The present invention relates to insulating flow and bushing blocks, bushing assemblies, fiber forming apparatus and methods of forming fibers, and more particularly to insulating blocks and bushing assemblies which facilitate the flow of molten fiberizable material to the peripheral regions of the blocks and assemblies.

BACKGROUND OF THE INVENTION

In typical direct-melt glass fiber forming operations, raw batch ingredients are melted and homogenized in a furnace and fed to a refractory-lined forehearth having a plurality of openings in its bottom wall or floor. Each opening in the bottom wall of the forehearth is fitted with an insulating refractory block or "flow block" that has an elongated slot or bore extending therethrough to permit flow of the molten glass through the flow block. A second insulating refractory block or "bushing block", also having an elongated bore therethrough, may be positioned beneath the flow block to receive the molten glass from the flow block. A bushing having a plurality of apertures or tips in its bottom wall is positioned below the bushing block to receive molten glass from the bore of the bushing block. Continuous fibers are formed from the molten glass by attenuating streams of the molten material through the apertures or tips in the bottom wall (also called a tip plate) of the bushing using a winder or other attenuation device.

The temperature and flow velocity of the supply of molten glass in the forehearth varies depending upon the position of the molten glass relative to the bottom wall of the forehearth. Molten glass that is adjacent to the bottom wall of the forehearth typically has a lower temperature and flow velocity then the molten glass which is spaced apart from the bottom wall. These temperature and flow velocity variations are largely due to the transfer of heat from the molten glass to the refractory blocks lining the bottom of the forehearth.

Since the cooler molten glass adjacent the bottom wall of the forehearth tends to flow in a laminar manner through the end regions of the slot and the hotter molten glass tends to flow through the central region of the slot and there is little mixing of the molten glass as it passes through these regions, the variations in temperature and flow velocity are maintained or even increased due to heat loss by contact with the walls of the slot in the flow block and bushing block. The temperature difference between the portion of molten glass flowing through the central region of the slot and the portion of molten glass flowing through end regions of the slot in the bushing block can be up to about 125° C. Similarly, the difference between the flow velocity of the molten glass flowing through the central region versus the peripheral region of the slot can be greater than about 0.01 meters per second (m/sec).

When the molten glass finally reaches the tip plate of the bushing, the molten glass adjacent to the end regions of the tip plate (which are aligned with the end regions of the flow and bushing blocks), often has a significantly lower temperature than the molten glass adjacent to the central region of the tip plate. Since the attenuation characteristics of molten glass are closely related to the temperature and flow velocity of the molten glass, non-uniform glass temperatures and flow velocities at the tip plate can contribute to production problems such as fiber diameter inconsistencies, fiber breakage during attenuation ("break-out") and low process efficiencies.

Attempts have been made to improve the temperature uniformity of molten glass by decreasing the amount of heat loss of the molten glass as it passes through the bushing block or by adding additional heat to the molten glass. For example, U.S. Pat. No. 4,249,398 discloses a bushing block having a wall with an insulating space and a radiation shield surrounding the insulating space to improve thermal isolation of the glass flowing through the block (col. 3, lines 62–65); U.S. Pat. No. 4,544,392 discloses the use of a bushing block with an auxiliary heater device to add heat to the molten material flowing through the ends of the bushing block (col. 1, lines 67–78 and col. 2, lines 1–2); and U.S. Pat. No. 4,161,396 discloses a bushing block with a substantially circular cylindrical flow passage configured to minimize the contact area between the glass and the surface of the flow passage to reduce the area available for heat transfer and heat loss in the glass (col. 1, lines 40–54 can col. 4, lines 6–14).

U.S. Pat. No. 5,709,727 discloses a bushing assembly including a glass receiving block having at least one cooling element interposed between the receiving block and the forehearth to remove heat from and redirect the flow of the molten glass to provide a more uniform temperature distribution throughout the glass (col. 2, lines 1–15).

U.S. Pat. No. 4,264,348 discloses a bushing block having a slot which is divided along its length into a plurality of separate sections having longitudinally inclined flow planes which divide glass flowing through the block into two or more portions along the length of the block and redirect the glass to emerge from the bushing block into areas substantially opposite to those in which it entered the block (col. 1, lines 55–62).

None of the foregoing references teach a simple, effective means for improving both the uniformity of the temperature and flow velocity of molten glass to improve fiber diameter consistency, reduce fiber break-out and improve process efficiency during fiber attenuation.

SUMMARY OF THE INVENTION

One aspect of the present invention is an insulating flow block formed from a refractory material for controlling flow of molten fiberizable material received from a forehearth supply to a fiber forming apparatus, the flow block comprising a central region and a peripheral region surrounding the central region, the flow block having a plurality of bores extending between a top surface of the flow block and a bottom surface of the flow block, each bore of the plurality of bores having an interior surface to define a passageway to permit flow of molten fiberizable material through the flow block.

Another aspect of the present invention is a molten material supply system for use in a fiber forming apparatus, the system comprising: (a) a supply of molten fiberizable material; (b) a forehearth comprising a bottom wall and a sidewall extending generally upwardly from an edge of the bottom wall to form a reservoir for the supply of molten fiberizable material, the bottom wall having an opening extending therethrough; and (c) an insulating flow block formed from a refractory material, the insulating flow block being positioned within the opening of the forehearth and comprising a central region and a peripheral region surrounding the central region, the flow block having a plurality of bores extending between a top surface of the flow block and a bottom surface of the flow block, each bore of the plurality of bores having an interior surface to define a passageway to permit flow of molten fiberizable material received from the reservoir of the forehearth through the flow block.

Yet another aspect of the present invention is a fiber forming apparatus for forming generally continuous fibers, the fiber forming apparatus comprising: (a) a supply of molten fiberizable material; (b) an insulating bushing block formed from a refractory material, the bushing block being positioned adjacent to the supply to receive molten fiberizable material therefrom, the bushing block comprising: a central region and a peripheral region surrounding the central region, the peripheral region comprising at least one pair of opposed subregions, a first subregion of the at least one pair of opposed subregions having a bore extending between a top surface of the bushing block and a bottom surface of the bushing block, the bore having an interior surface to define a passageway to permit flow of molten fiberizable material received from the supply through the first subregion of the bushing block, and (c) a metal bushing positioned to receive molten fiberizable material from the bore of the first subregion of the bushing block, the bushing comprising: (1) a bottom wall having a plurality of apertures to permit flow of molten fiberizable material received from the bushing block therethrough; (2) a sidewall extending generally upwardly from an edge of the bottom wall to form a reservoir for the supply of molten fiberizable material; and (3) a peripheral region adjacent to the sidewall of the bushing, wherein an inner portion of a top edge of the sidewall of the bushing is positioned in general registry with an inner portion of a bottom edge of the interior surface of the bore of the first subregion of the bushing block to facilitate flow of at least a portion of molten fiberizable material toward a portion of the peripheral region of the bushing adjacent to the sidewall of the bushing.

Still another aspect of the present invention is a method for promoting uniformity of temperature of a molten fiberizable material in a fiber forming apparatus, the method comprising the steps of: (a) providing a supply of molten fiberizable material to an insulating refractory flow block comprising a central region, a peripheral region surrounding the central region, and a plurality of bores extending through the flow block; (b) flowing concomitantly a first portion of the supply of molten fiberizable material through a first bore of the plurality of bores and a second portion of the supply of molten fiberizable material through a second bore of the plurality of bores of the flow block into a bushing assembly of a fiber forming apparatus; and (c) attenuating generally continuous fibers of molten fiberizable material from the fiber forming apparatus.

Still another aspect of the present invention is a method of forming generally continuous fibers from a supply of molten fiberizable material, the method comprising the steps of: (a) providing a supply of molten fiberizable material to an insulating refractory bushing block comprising a central region and a peripheral region surrounding the central region, the peripheral region having a bore extending therethrough to permit flow of molten fiberizable material received from the supply through the bushing block; (b) aligning a bushing to receive molten fiberizable material from the bushing block, the bushing comprising a bottom wall having a plurality of apertures to permit flow of molten fiberizable material received from the bushing block therethrough, a sidewall extending generally upwardly from an edge of the bottom wall, and a peripheral region adjacent to the sidewall of the bushing such that an inner portion of a top edge of the sidewall of the bushing is positioned in general registry with an inner portion of a bottom edge of an interior surface of the bore of the peripheral region of the bushing block; (c) flowing a portion of the supply of molten fiberizable material through the bore of the peripheral region of the bushing block into the bushing such that at least a portion of the supply of molten fiberizable material flows toward a portion of the peripheral region of the bushing adjacent to the sidewall; and (d) attenuating generally continuous fibers of the molten fiberizable material through the apertures of the bottom wall of the bushing.

BRIEF DESCRIPTION OF THE DRAWINGS

The foregoing summary and the following detailed description of the preferred embodiments will be better understood when read in conjunction with the appended drawings. In the drawings:

FIG. 4 is a top plan view of an alternative embodiment of a flow block according the present invention;

FIG. 5 is a cross-sectional elevational view of the flow block of FIG. 4, taken along line 5—5 of FIG. 4;

FIG. 6 is a cross-sectional elevational view of the flow block of FIG. 4, taken along line 6—6 of FIG. 4;

FIG. 11 is a top plan view of another alternative embodiment of a flow block according to the present invention;

FIG. 12 is a cross-sectional elevational view of the flow block of FIG. 11, taken along line 12—12 of FIG. 11;

FIG. 15 is a schematic cross-sectional elevational view of another alternative embodiment of a portion of a fiber forming apparatus according to the present invention;

FIG. 15a is an enlarged view of a portion of the apparatus of FIG. 15;

FIG. 15b is an enlarged view of another portion of the apparatus of FIG. 15;

FIG. 23 is a top plan view of another alternative embodiment of a bushing block according to the present invention;

FIG. 24 is a cross-sectional elevational view of the bushing block of FIG. 23, taken along line 24—24 of FIG. 23;

FIG. 25 is a top plan view of another alternative embodiment of a bushing block according to the present invention; and FIG. 26 is a cross-sectional elevational view of the bushing block of FIG. 25, taken along line 26—26 of FIG. 25.

DETAILED DESCRIPTION OF THE PREFERRED EMBODIMENTS

Temperature and flow velocity variations in molten fiberizable material at the tip plate of a bushing used in the production of continuous fibers are detrimental to both the quality of the fibers produced and the efficiency of the production process. By improving the uniformity of the temperature and the flow velocity of the molten fiberizable material at the tip plate of the bushing, the present invention can improve the uniformity of the diameter of the fibers being produced, reduce break-out of the fibers during the attenuation process and improve process efficiency.

As will be discussed in detail below, the improvement in temperature and flow velocity uniformity at the tip plate is achieved by diverting a portion of a supply of molten fiberizable material that would conventionally flow through a single, elongated slot extending through a central region of a flow and/or bushing block to instead flow through one or more isolated bores extending through a peripheral region of the flow and/or bushing blocks. The effect of this re-allocation of relatively hot molten fiberizable material from the central region to the peripheral region of the blocks is to enhance passive mixing and thereby increase the homogeneity of the temperature and flow velocity of the molten fiberizable material flowing through the flow and/or bushing block(s).

Figure 1:
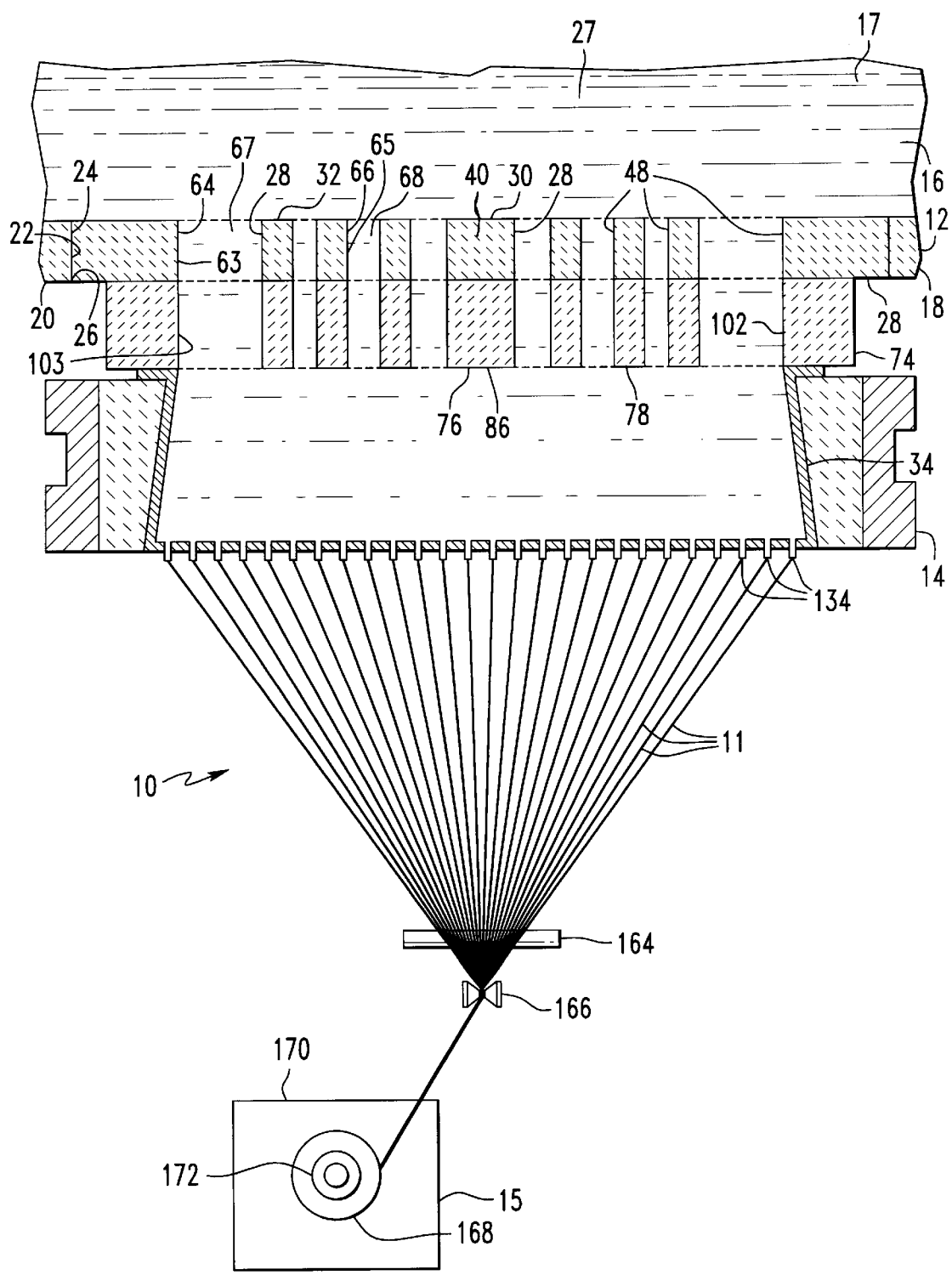
FIG. 1 is a schematic cross-sectional elevational view of a preferred embodiment of a fiber forming apparatus according to the present invention.

Referring to the drawings, wherein like numerals indicate like elements throughout, there is shown in FIG. 1 a fiber forming apparatus, generally designated 10, according to a preferred embodiment of the present invention. The fiber forming apparatus comprises a molten material supply system 12, a bushing assembly 14, and a device 15 for attenuating generally continuous fibers 11.

The molten material supply system 12 comprises a supply 16 of molten fiberizable material 17 contained in a forehearth 18. The forehearth 18 comprises a bottom wall 20 having an opening 22 extending therethrough and a sidewall 24 extending generally upwardly from an edge 26 of the bottom wall 20 to form a reservoir 27 for the supply 16 of molten fiberizable material 17. A flow block 28 according to the present invention is positioned within the opening 22 of the forehearth 18 to control the flow of molten fiberizable material 17 received from the forehearth 18 to the bushing assembly 14.

As used herein "molten fiberizable material" means any material capable of being formed into generally continuous fibers or filaments. Examples of fiberizable materials include fiberizable glass compositions (which are preferred), natural organic polymers, synthetic organic polymers, and other inorganic, non-glass substances that can be formed into generally continuous filaments. For more information, see *Encyclopedia of Polymer Science and Technology*, Vol. 6 at pages 505–712, which are hereby incorporated by reference.

As used herein, the term "fiberizable glass compositions" means compositions based upon oxide compositions such as silicates selectively modified with other oxide and non-oxide compositions that are formable into essentially continuous fibers. Examples of fiberizable glass compositions useful herein include, but are not limited to: "E-glass" (which is preferred), "A-glass", "C-glass", "D-glass", "R-glass", "S-glass", Basalt-glass and E-glass derivatives that are fluorine-free and/or boron-free. The formulations for these and other glass compositions are well known to those skilled in the art. If more information is needed, see K. Loewenstein, *The Manufacturing Technology of Glass Fibers*, (3rd. Ed. 1993) at pages 31–36, which are hereby incorporated by reference.

The flow block 28 of the present invention comprises an insulating refractory material which resists thermal degradation, corrosion and erosion by the flow of the molten fiberizable material. Suitable refractory materials include but are not limited to: metal oxides, metals nitrides, metal carbides, metal borides and mixtures thereof. Preferably the refractory material is a metal oxide selected from zirconium oxide, silicon oxide, aluminum oxide, chromium oxide, titanium oxide, zircon and mixtures thereof. More preferably the metal oxide is chromium oxide.

The dimensions of the flow block 28 depend upon several factors, such as the configuration of the forehearth 18 and the size of the bushing 34. For example, referring to FIGS. 2 and 3, the overall length 35 of the flow block 28 can range from about 0.33 meters (m) to about 2.5 m, the overall width 36 of the flow block 28 can range from about 0.1 m to about 0.5 m, and the overall thickness 38 of the flow block 28 can range from about 0.03 m to about 0.1 m.

Figure 2:
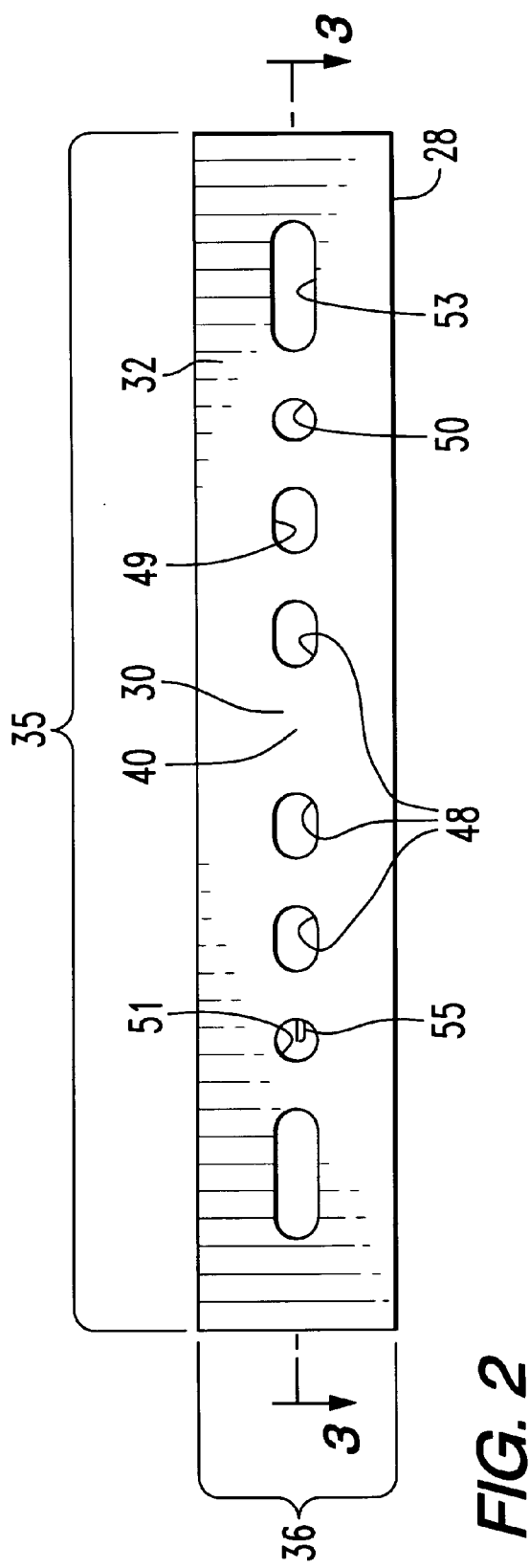
FIG. 2 is a top plan view of a flow block according to the present invention.
Figure 3:
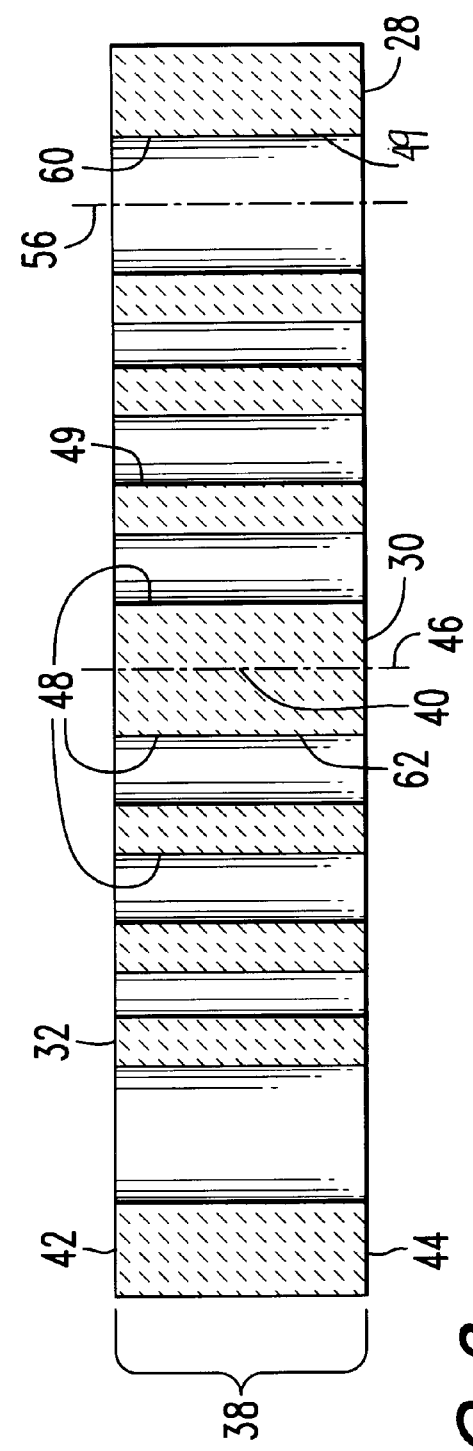
FIG. 3 is a cross-sectional elevational view of the flow block of FIG. 2, taken along line 3—3 of FIG. 2.

Referring to FIGS. 1, 2 and 3, the flow block 28 of the present invention comprises a central region 30 and a peripheral region 32 surrounding the central region 30. The central region 30 of the flow block 28 is located proximate to the geometric center 40 of the flow block 28, extends between a top surface 42 and a bottom surface 44 of the flow block 28 and generally comprises about ten (10) percent to about 25 percent of the overall length 35 of the flow block 28 and about ten (10) percent to about 50 percent of the overall width 36 of the flow block 28.

The central region 30 comprises from about one (1) percent to about 50 percent of the total geometric volume of the flow block 28 and preferably about one (1) percent to about 25 percent of the total geometric volume of the flow block 28. As shown in FIG. 3, the central region 30 is bisected by a central axis 46 of the flow block 28 which is generally perpendicular to the top surface 42 and bottom surface 44 of the flow block 28. It will be recognized by one skilled in the art that the total geometric volume of the flow block generally can be calculated by multiplying the length, width, and thickness of the flow block.

The peripheral region 32 of the flow block 28 surrounds the central region 30 and extends between the top surface 42 and the bottom surface 44 of the flow block 28. The peripheral region 32 generally comprises from about 50 percent to about 99 percent of the total geometric volume of the flow block 28 and preferably about 75 percent to about 99 percent of the total geometric volume of the flow block 28.

The flow block 28 comprises a plurality of bores 48 extending between and connecting the top surface 42 and the bottom surface 44 of the flow block 28. The total number of bores 48 can range from two (2) to about ten (10) and preferably ranges from two (2) to about eight (8). For example, is shown in FIG. 2, the number of bores in the flow block 28 is eight (8).

The shape of the cross-section 50 of each bore 49 can be independently selected from the group consisting of square, rectangular, circular, and elliptical. As shown in FIG. 4, if the shape of the cross-section 450 of the bore 451 is rectangular, preferably the corners 452 or the outer ends 454 of the bore 451 are rounded.

The cross-sectional area of each bore 49 is preferably constant along a central, longitudinal axis 56 of the bore 49, however, the cross-sectional area can vary along the central axis 56 of the bore 49. For example, as shown in FIG. 6, the cross-sectional area of bore 453 at the top surface 442 of the flow block 428 is less than the cross-sectional area of bore 453 at the bottom surface 444 of the flow block 428. Also, as shown in FIG. 6, a portion 469 of the interior surface 460 of bore 453 can be tapered at an angle 461 ranging from about 1° to about 75° with respect to the central axis 456 of the bore 453. Preferably, however, as shown in FIG. 3 the interior surface 60 of each bore 49 of the plurality of bores 48 of the flow block 28 is parallel to its central axis 56.

Figure 8:
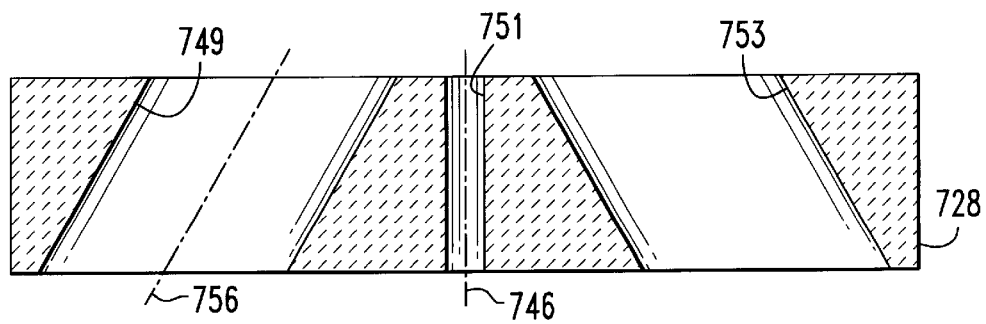
FIG. 8 is a cross-sectional elevational view of the flow block of FIG. 7, taken along line 8—8 of FIG. 7.

As used herein, "central axis of the bore" is an axis 56 of the bore 49 that generally corresponds to a center line of the bore 49. Preferably, the central axis 56 of each bore 49 extending through the flow block 28 is generally parallel to the central axis 46 of the flow block 28, however, the central axis 56 of the bore 49 can be angled with respect to the central axis 46 of the flow block 28. For example, as shown in FIG. 8, the central axis 756 of bore 749 can be angled from about 1° to about 75° with respect to a central axis 746 of the flow block 728.

The configuration of each bore 49 of the plurality of bores 48 of the flow block 28 can be the same or different. For example, as shown in FIG. 2, the general shape of a cross-section 50 of one bore 51 can be different from that of another bore 53 or the open volume for flow of the molten fiberizable material through one bore 51 can be different from (greater than or less than) that of bore 53.

As used herein, the term "open volume" means the volume of the passageway 62 (shown in FIG. 3) of each bore 49 through which molten fiberizable material can flow as defined by an interior surface 60 of the bore 49.

The open volume of a bore can be readily determined by one skilled in the art using well known mathematical formulas such as those given in G. A. Korn and T. M. Korn, *Mathematical Handbook for Scientists and Engineers*, (2nd Ed., 1968) at pages 881–884 which are hereby incorporated by reference. For example, the volume "V" of a cylindrical bore 51 having a height "h" equal to the thickness 38 of the flow block 28 and a constant circular cross-section having a radius "r" 55 can be determined by the following equation (I):

$$V = \pi r^2 h \tag{I}$$

As used herein, the term "total open volume of the flow block" means the sum of the open volume of each bore 49 of the plurality of bores 48 extending through the flow block 28. The total open volume of the flow block 28 can range from about five (5) percent to about 95 percent of the total volume of the flow block 28 and more preferably ranges from about 35 percent to about 60 percent of the total volume of the flow block 28.

Similarly, the "total open volume of the central region" or "total open volume of the peripheral region" of the flow block 28 is the sum of the open volume of each bore 49 extending through the central region 30 or the peripheral region 32, respectively, of the flow block 28. The total open volume of the central region 30 of the flow block 28 can range from zero (0) percent to about 20 percent of the total volume of the flow block 28. The total open volume of the peripheral region 32 of the flow block 28 can range from about five (5) percent to about 35 percent of the total volume of the flow block 28.

Figure 7:
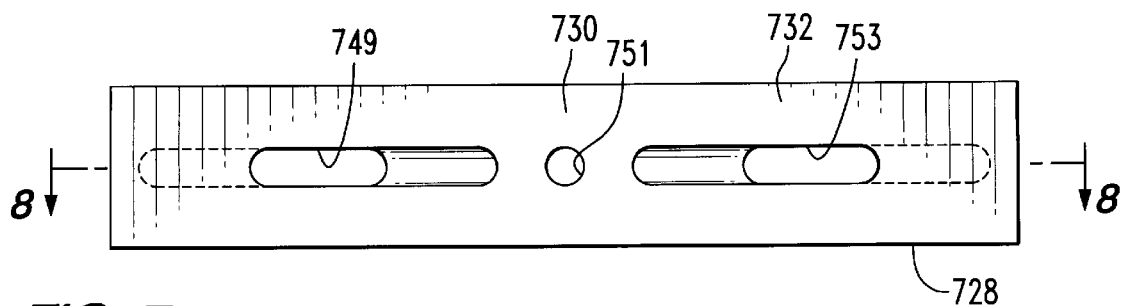
FIG. 7 is a top plan view of another alternative embodiment of a flow block according to the present invention.

It will be recognized by one skilled in the art that the total number of bores in the flow block 28 and the configuration and location of each bore 49 will depend upon several factors, such as temperature and composition of the molten fiberizable material, mass flow rate of the molten fiberizable material in the forehearth, overall size of the flow block, desired temperature distribution at the tip plate, and mass flow rate and size of the bushing to name a few. For example, in one embodiment of a flow block 728 according to the present invention shown in FIGS. 7 and 8, the number, configuration and location of the bores 749, 751 and 753 are selected such that the total open volume of the peripheral region 732 of the flow block 728 is about 15 percent of the total volume of the flow block 728 and is about six (6) times greater than the total open volume of the central region 730 of the flow block 728.

In a preferred alternative embodiment of a flow block 28 according to the present invention shown in FIGS. 2 and 3, the flow block 28 is free of bores in the central region 30 and each bore 49 of the plurality of bores 48 extends through the peripheral region 32 of the flow block 28 such that the total open volume of the peripheral region is approximately equal to the total open volume of the flow block 28.

Figure 9:
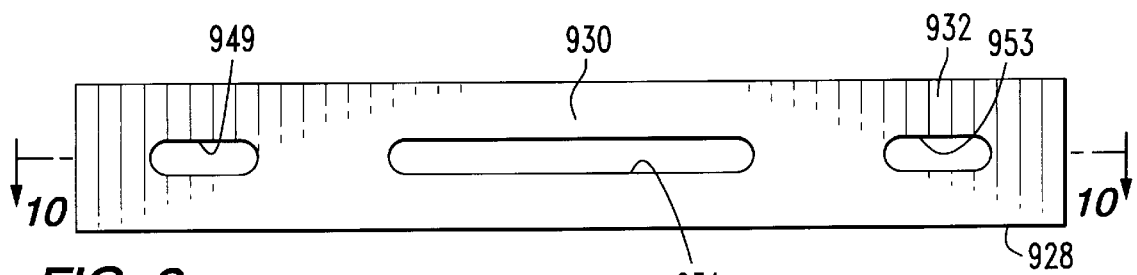
FIG. 9 is a top plan view of another alternative embodiment of a flow block according to the present invention.
Figure 10:
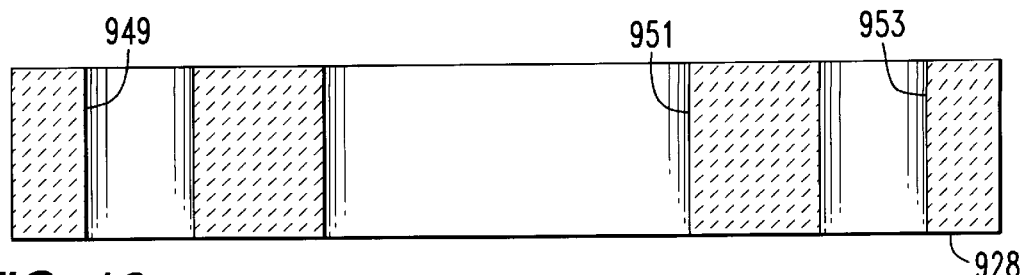
FIG. 10 is a cross-sectional elevational view of the flow block of FIG. 9, taken along line 10—10 of FIG. 9.

In another alternative embodiment of a flow block 928 of the present invention shown in FIGS. 9 and 10, the number of bores and configuration and location of each bore 949, 951, and 953 is selected such that the total open volume provided by bore 951 in the central region 930 of the flow block 928 is approximately 65 percent greater than the total open volume provided by the bores 949 and 953 of the peripheral region 932 of the flow block 928. The total open volume of the flow block 928 is about ten (10) percent of the total geometric volume of the flow block 928.

In yet another alternative embodiment of a flow block 1128 of the present invention shown in FIGS. 11 and 12, the number, configuration and location of the plurality of bores 1148 is selected such that the total open volume provided by bores 1110 and 1112 of the central region 1130 of the flow block 1128 is approximately equal to the total open volume provided by bores 1114 and 1116 of the peripheral region 1132 of the flow block 1128 and the total open volume of the flow block 1128 is about 6 percent of the total geometric volume of the flow block 1128.

Referring now to FIGS. 2 and 3, each bore 49 of the plurality of bores 48 has an interior surface 60 defining a passageway 62 to permit the flow of molten fiberizable material through the flow block 28. The interior surface 60 of each bore 49 is preferably smooth, however it can have protuberances such as ridges and/or channels. As shown in FIG. 1, preferably the passageway 63 of a first bore 64 is isolated from the passageway 65 of a second bore 66 such that a portion 67 of the supply 16 of molten fiberizable material 17 flowing through the passageway 63 of the first bore 64 is isolated from a portion 68 of the supply 16 of molten fiberizable material 17 flowing through the passageway 65 of the second bore 66.

The flow block of the present invention can be formed by any method well known to those skilled in the art. For example, the flow block can be cast and the bores formed subsequently in the block by drilling or the flow block can be cast with pre-formed bores. Alternatively, the flow block can be formed in halves or quarters and subsequently assembled to form a complete flow block.

Figure 13:
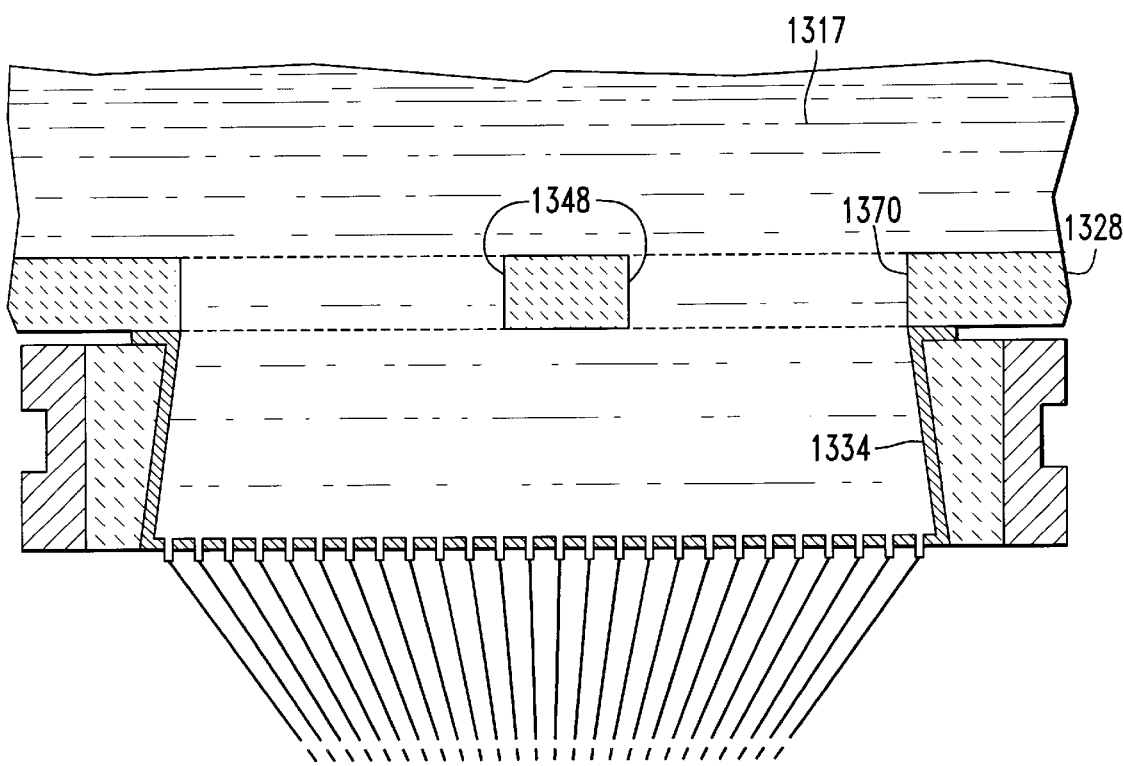
FIG. 13 is a schematic cross-sectional elevational view of a portion of a fiber forming apparatus according to the present invention.
Figure 14:
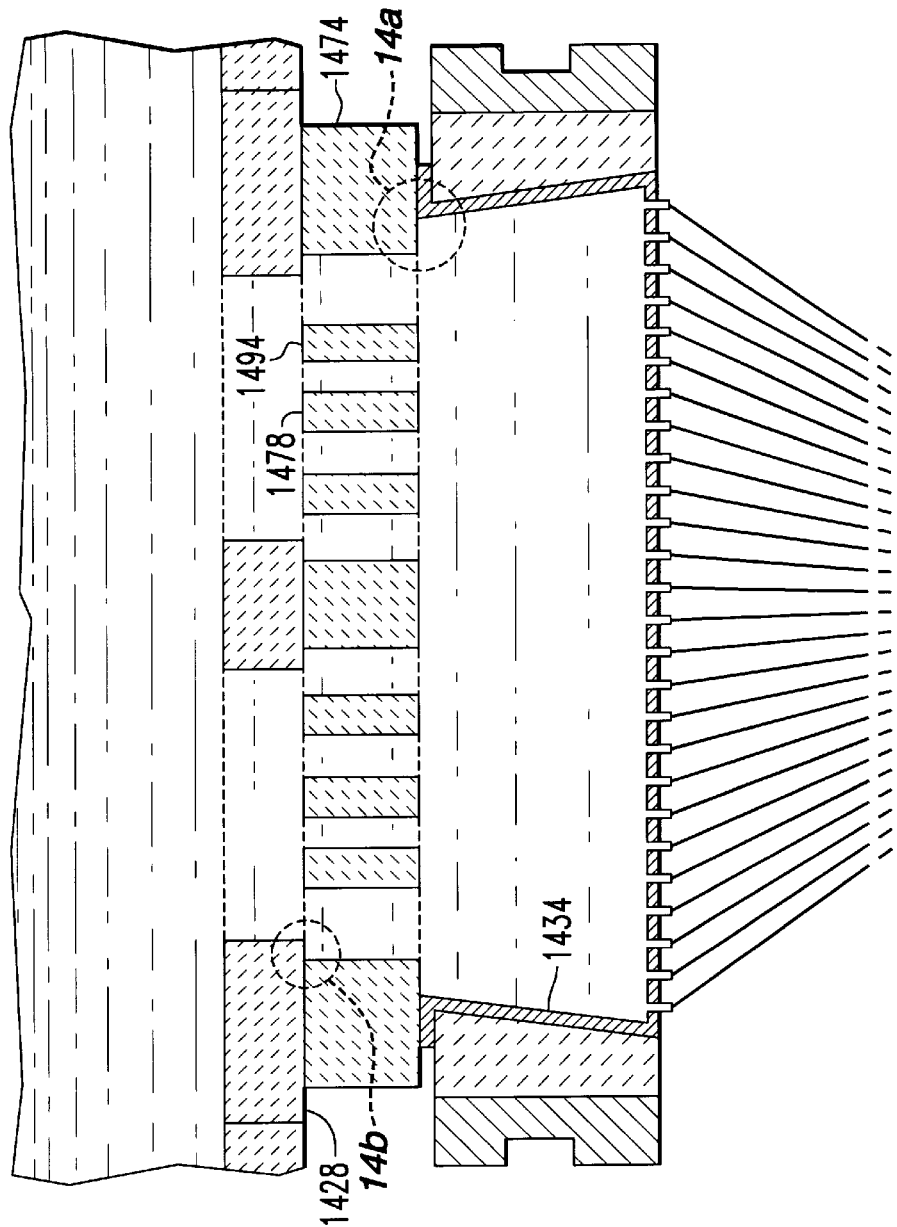
FIG. 14 is a schematic cross-sectional elevational view of an alternative embodiment of a portion of a fiber forming apparatus according to the present invention.

Referring now to FIG. 13, a bushing 1334 can be positioned directly beneath a flow block 1328 of the present invention to receive molten fiberizable material 1317 directly from at least one bore 1370 of the plurality of bores 1348 of the flow block 1328. Preferably, however, a bushing block 1474 is interposed between the flow block 1428 and bushing 1434, as shown in FIG. 14. Generally, the flow block 28 of the present invention can be used in conjunction with a conventional bushing assembly including a bushing block having a single, elongated slot or it can be used in combination with a bushing assembly having multiple passageways according to the present invention which is discussed in detail below.

Referring now to FIG. 15, in another aspect of the present invention, a bushing assembly 1514 according to the present invention, comprising a bushing block 1574 and a bushing 1534, is positioned beneath a flow block 1572 to receive molten fiberizable material 1517 therefrom. One skilled in the art would understand that either a conventional single-bore flow block 1572 (shown in FIG. 15) or a flow block 28 having a plurality of bores 48 according to the present invention, as discussed above and shown in FIG. 1, can be used in combination with the bushing assembly 14 of the present invention. While preferably the bushing assembly 14 of the present invention is used in combination with a flow block 28 having a plurality of bores 48 (shown in FIG. 1) according to the present invention, it can be desirable to use the bushing assembly 14 of the present invention with a conventional single-slot flow block 1572 (shown in FIG. 15) to permit use of different bushing assemblies with a single flow block.

Referring to FIG. 1, the bushing assembly 14 of the present invention comprises a bushing block 74 comprising a refractory material which resists thermal degradation, corrosion and erosion by the flow of the molten fiberizable material. Suitable refractory materials refractory include but are not limited to: metal oxides, metals nitrides, metal carbides, metal borides. Preferably the refractory material is a metal oxide selected from zirconium oxide, aluminum oxide, chromium oxide, titanium oxide, zircon and mixtures thereof. More preferably the metal oxide is zirconium oxide.

Figure 16:
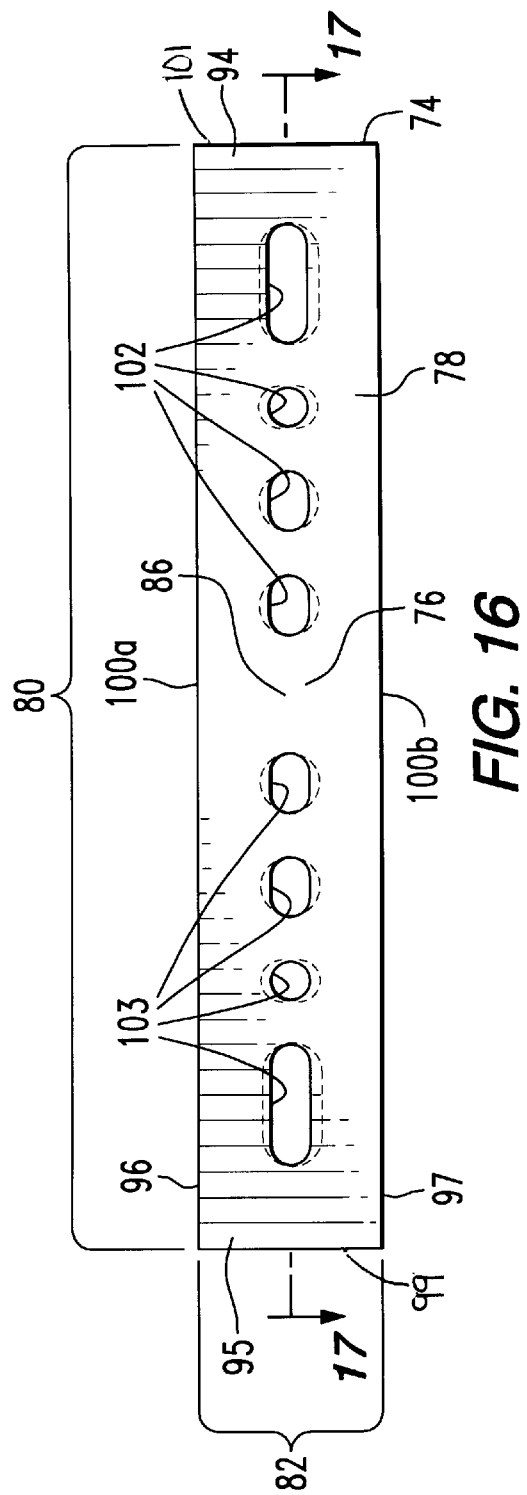
FIG. 16 is a top plan view of a bushing block according to the present invention.
Figure 17:
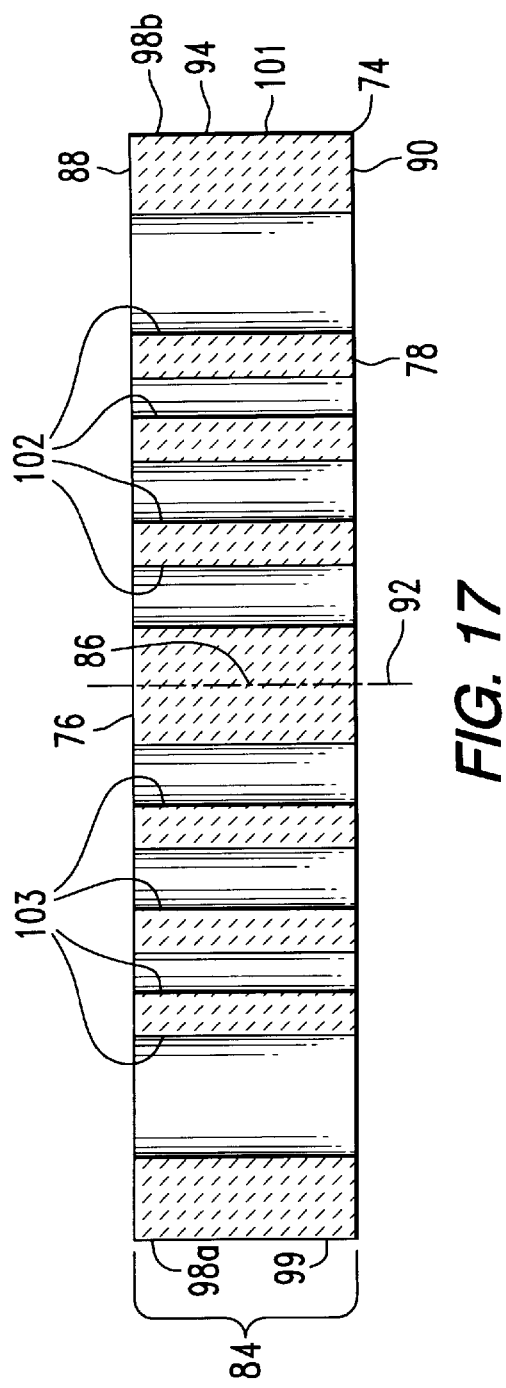
FIG. 17 is a cross-sectional elevational view of the bushing block of FIG. 16, taken along line 17—17 of FIG. 16.

The dimensions of the bushing block 74 depend upon several factors, such as the configuration of the forehearth 18, the configuration and size of the flow block 28 and the size of the bushing 34, to name a few. Referring now to FIGS. 16 and 17, the overall length 80 of the bushing block 74 can range from about 0.33 m to about 2.5 m, the overall width 82 of the bushing block 74 can range from about 0.1 m to about 0.5 m, and the overall thickness 84 of the bushing block 74 can range from about 0.03 m to about 0.1 m.

Referring to FIGS. 1, 16 and 17, the bushing block 74 of the present invention comprises a central region 76 and a peripheral region 78 surrounding the central region 76. The central region 76 of the bushing block 74 is located proximate the geometric center 86 of the bushing block 74, extends between a top surface 88 and a bottom surface 90 of the bushing block 74 and comprises about ten (10) percent to about 25 percent of the overall length 80 and about ten (10) percent to about 50 percent of the overall width 82 of the bushing block 74.

The central region 76 comprises from about one (1) percent to about 50 percent and preferably about one (1) percent to about 25 percent of the total geometric volume of the bushing block 74. Methods for calculating the total geometric volume are discussed above. As shown in FIG. 17, the central region 76 is bisected by a central axis 92 of the bushing block 74 which is generally perpendicular to the top surface 88 and the bottom surface 90 of the bushing block 74.

The peripheral region 78 of the bushing block 74 surrounds the central region 76 and extends between the top surface 88 and the bottom surface 90 of the bushing block 74. The peripheral region 78 comprises about 50 percent to about 99 percent of the total volume of the bushing block 74 and preferably about 75 percent to about 99 percent.

The peripheral region 78 of the bushing block 74 comprises at least one pair of opposed subregions 94, 95. Preferably a first subregion 94 of the at least one pair of opposed subregions 94, 95 comprises from about one (1) percent to about 50 percent of the total volume of the peripheral region 78 of the bushing block 74.

The at least one pair of opposed subregions 94, 95 can be a pair of opposed side regions 96, 97 or a pair of opposed end regions 99, 101, which is preferred. As used herein the term "end region" means a region adjacent to an end 98a, 98b of the block and the term "side region" means a region adjacent to a side 100a, 100b of the bushing block 74.

The bushing block 74 of the present invention comprises one or more bores 102 extending through at least one subregion selected from the first subregion 94 and the second subregion 95 of the at least one pair of opposed subregions 94, 95 of the peripheral region 78 of the bushing block 74. The bushing block 74 can comprise one or more bores 102 extending through the first subregion 94 and one or more bores 103 extending through the second subregion 95 of the at least one pair of opposed subregions 94, 95 of the peripheral region 78 and/or one or more bores 1804 (shown in FIGS. 18 and 19) extending through the central region 1876 of the bushing block 1874. Preferably, as shown in FIGS. 16 and 17, the bushing block 74 comprises one or more bores 102, 103 extending through each subregion 94, 95, respectively.

The total number of bores extending through the bushing block 74 can range from one (1) to about ten (10) and preferably ranges from two (2) to about eight (8). For example, as shown in FIGS. 16 and 17, the number of bores in the bushing block 74 is eight (8).

Figure 18:
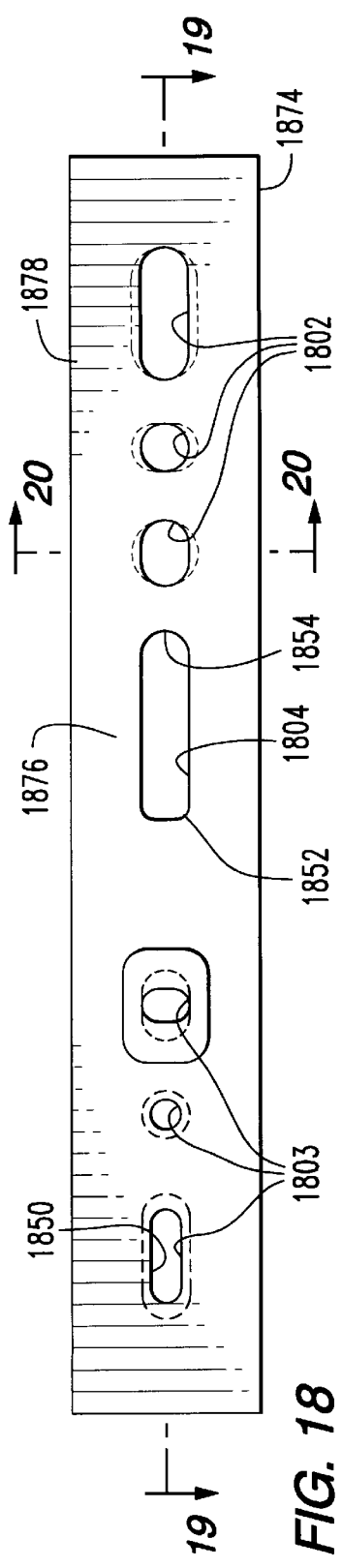
FIG. 18 is a top plan view of an alternative embodiment of a bushing block according to the present invention.

Referring to FIG. 18, the general shape of the cross-section 1850 of the bores 1802, 1803, 1804 of the bushing block 1874 can be independently selected from the group consisting of square, rectangular, circular, and elliptical. If the cross-section of the bore 1804 is rectangular, preferably the corners 1852 of the bore 1804, and more preferably the ends 1854 of the bore 1804 are rounded in a manner similar to that discussed above for the flow block 28.

Figure 19:
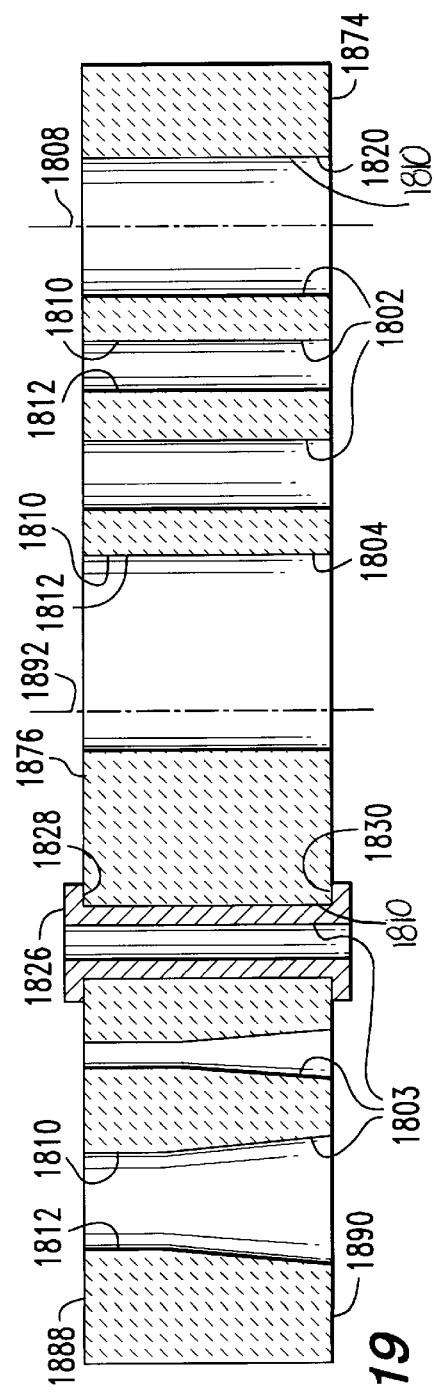
FIG. 19 is a cross-sectional elevational view of the bushing block of FIG. 18, taken along line 19—19 of FIG. 18.
Figure 20:
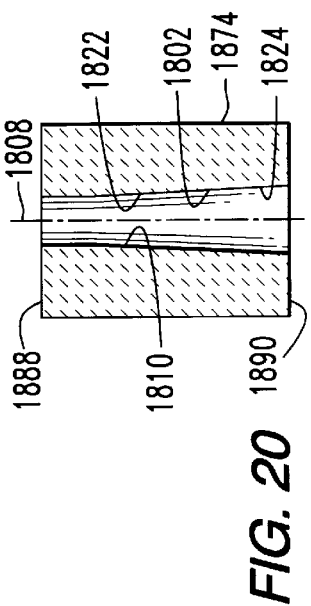
FIG. 20 is a cross-sectional elevational view of the bushing block of FIG. 18, taken along line 20—20 of FIG. 18.

Referring to FIG. 19, the cross-sectional area of each of the bores 1802, 1803, 1804 can be constant or varied along a respective central axis 1808 of each bore. Preferably, the cross-sectional area of the bore 1802 at the top surface 1888 of the bushing block 1874 is less than the cross-sectional area of the bore 1802 at the bottom surface 1890 of the bushing block 1874, as shown in FIG. 20.

Figure 22:
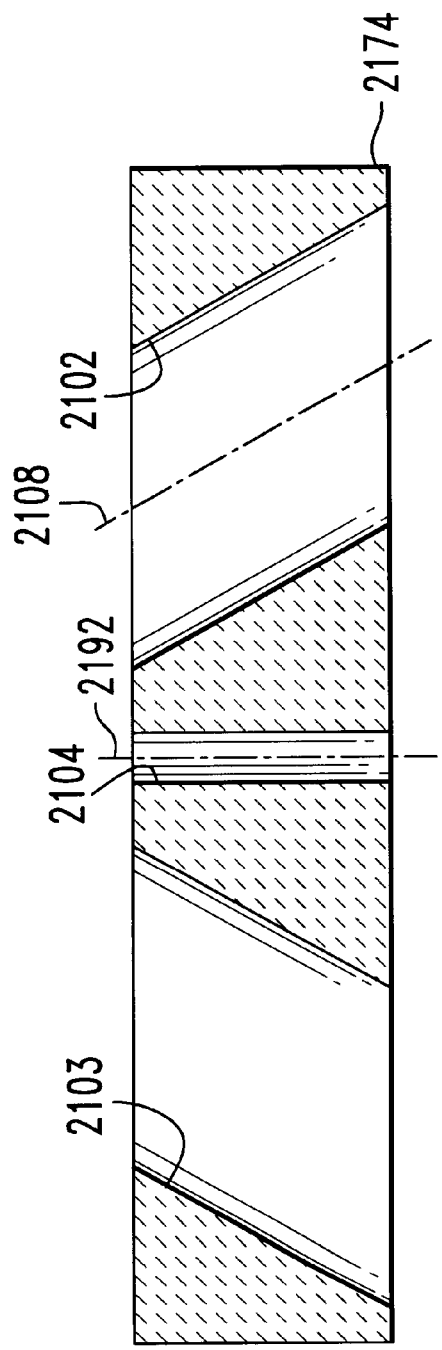
FIG. 22 is a cross-sectional elevational view of the bushing block of FIG. 21, taken along line 22—22 of FIG. 21.

As shown in FIG. 19, the central axis 1808 of a bore 1802 extending through the bushing block 1874 can be generally parallel to the central axis 1892 of the bushing block 1874. Alternately, as shown in FIG. 22, the central axis 2108 of a bore 2102 can be angled from about 1° to about 75° with respect to the central axis 2192 of the bushing block 2174.

One skilled in the art would understand that the total number of bores in the bushing block and the configuration and location of each bore depends upon several factors, such as the temperature and composition of the molten fiberizable material, mass flow rate of the molten fiberizable material in the forehearth, size and configuration of the flow block, desired temperature distribution at the tip plate, and mass flow rate and size of the bushing.

Referring now to FIGS. 16 and 17, the number, (configuration, and location of the bores 102, 103 of the bushing block 74 is selected such that from about two (2) percent to about 100 percent and more preferably from about five (5) percent to about 85 percent of the volume of molten fiberizable material that typically would pass through the central region of a conventional single-slot bushing block (shown in FIG. 15) is diverted in the bushing block 74 of the present invention to flow through bore 102 in the first subregion 94 of the peripheral region 78 of the bushing block 74. More preferably, the flow of molten material is diverted to flow through bores 102, 103 in subregions 94, 95 of the peripheral region 78 of the bushing block 74.

As shown in FIGS. 16 and 17, in a preferred embodiment of a bushing block 74 according to the present invention, each subregion 94 and 95 of the at least one pair of subregions 94 and 95 of the peripheral region 78 of the bushing block 74 has a plurality of bores 102, 103 extending therethrough such that the total open volume for flow of molten material through the peripheral region 78 of the bushing block 74 is approximately equal to the total open volume for flow of molten material through the bushing block 74.

Figure 21:
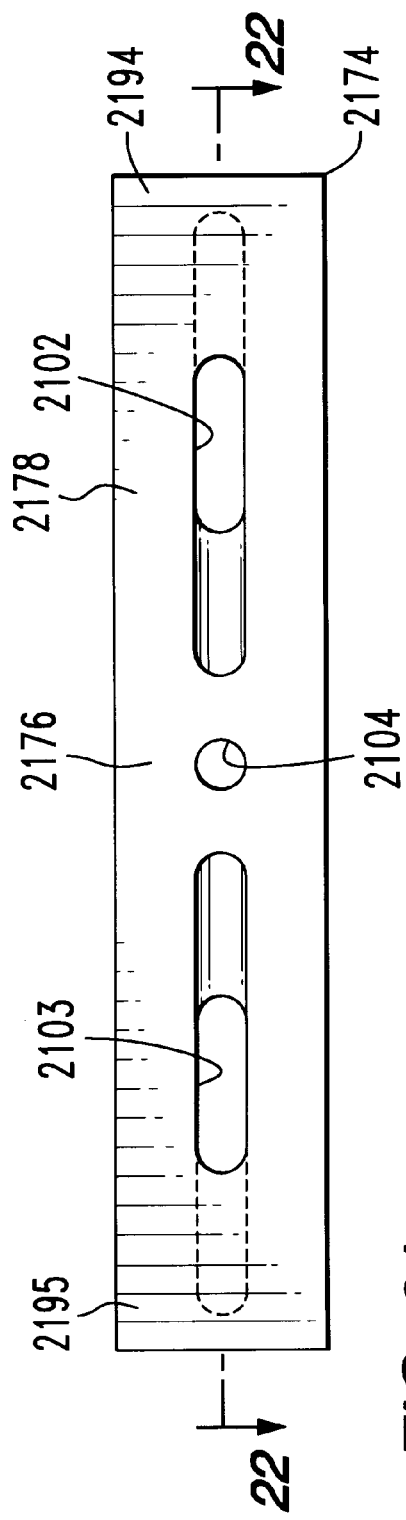
FIG. 21 is a top plan view of another alternative embodiment of a bushing block according to the present invention.

In an alternative embodiment of the present invention shown in FIGS. 21 and 22, each subregion 2194, 2195 of the peripheral region 2178 and central region 2176 of the bushing block 2174 have bores 2102, 2103, 2104, respectively, extending therethrough. The configuration of bores 2102, 2103, 2104, is selected such that the total open volume provided by bores 2102, 2103 for flow of molten material through the peripheral region 2178 of the bushing block 2174 is about six (6) times greater than the total open volume provide by bore 2104 for flow of molten material through the central region 2176 of the bushing block 2174. The total open volume for flow of molten material through the bushing block 2174 is about 15 percent of the total geometric volume of the bushing block 2174.

In another alternative embodiment of a bushing block 2374 of the present invention shown in FIGS. 23 and 24, each subregion 2394, 2395 of the peripheral region 2378 and central region 2376 have bores 2302, 2303, 2304, respectively, extending therethrough. The configuration of bores 2302, 2303, 2304 is selected such that the total open volume provided by bore 2304 for flow of molten material through the central region 2376 of the bushing block 2374 is approximately 65 percent greater than the total open volume provided by bores 2302, 2303 for flow of molten material through the peripheral region 2378 of the bushing block 2374. The total open volume for flow of molten material through the bushing block 2374 is about ten (10) percent of the total geometric volume of the bushing block 2374.

In yet another alternative embodiment of a bushing block 2574 of the present invention shown in FIGS. 25 and 26, a first subregion 2594 of the at least one pair of subregions 2594, 2595 of the peripheral region 2578 and the central region 2576 of the bushing block 2574 have bores 2502, 2504, respectively, extending therethrough. The configuration of bores 2502, 2504 is selected such that the total open volume for flow of molten material through the peripheral region 2578 of the bushing block 2574 is approximately equal to the total open volume for flow of molten material through the central region 2576 of the bushing block 2574 and is approximately 13 percent of the total geometric volume of the bushing block 2574.

Referring now to FIG. 19, each of the bores 1802, 1803, 1804 of bushing block 1874 has an interior surface 1810 which defines a passageway 1812 to permit the flow of molten fiberizable material (not shown) through the bushing block 1874. The interior surface 1810 of one or more bores is preferably smooth however, it can have protuberances such as ridges and channels. If the bushing block 1874 has more than one bore, then preferably the passageways are not interconnected within the bushing block 1874. For example, as shown in FIG. 15, the passageway 1512 of a first bore 1551 of the bushing block 1574 is not connected to or is isolated from the passageway 1515 of a second bore 1553 of the bushing block 1574 such that a portion 1518 of the supply 1516 of molten fiberizable material 1517 passing through the passageway 1512 of the first bore 1551 is isolated from the portion 1519 of the supply 1516 of molten fiberizable material 1517 flowing through the passageway 1515 of the second bore 1553.

Referring to FIGS. 18–20, a portion 1820 of the interior surface 1810 of bore 1802 can be generally parallel to the central axis 1808 of the bore 1802 or it can be angled (tapered) with respect to the central axis 1808. Preferably, as shown in FIG. 20, a portion 1822 of the interior surface 1810 of the bore 1802 adjacent the top surface 1888 of the bushing block 1874 is parallel to the central axis 1808 of the bore 1802 and a portion 1824 of the interior surface 1810 of the bore 1802 adjacent the bottom surface 1890 of the bushing block 1874 is angled with respect to the central axis 1808.

Referring now to FIG. 19, the bushing block 1874 can further comprise a metal lining 1826 positioned on a portion 1828 of the top surface 1888, a portion 1830 the bottom surface 1890, and the interior surface 1810 of the one or more bores of the bushing block 1874 to prevent erosion and corrosion of the refractory material due to flow of the molten fiberizable material through the bores. Preferably, the metal lining 1826 is formed from a platinum-containing material, such as platinum or platinum alloys. Non-limiting examples of platinum-containing materials are platinum-rhodium alloys, dispersion strengthened platinum alloys and dispersion strengthened platinum-rhodium alloys, which are preferred. For more information on useful platinum-containing materials, see Loewenstein, (3rd. Ed. 1993) at pages 122–126, which are hereby incorporated by reference.

Referring to FIG. 15, the bushing assembly 1514 of the present invention also comprises a bushing 1534 comprising a bottom wall 1532 having a plurality of apertures 1535 to permit the flow of molten fiberizable material 1517 received from the bushing block 1574 therethrough. A sidewall 1536 extends generally upwardly from and edge 1537 of the bottom wall 1532. The sidewall 1536 preferably has a flange or top edge 1538. A peripheral region 1540 is located adjacent to the sidewall 1536 of the bushing 1534. Preferably, as shown in FIGS. 15 and 15*a*, the bushing 1534 is positioned such that an inner portion 1541 of the top edge 1538 of the sidewall 1536 of the bushing 1534 is positioned in general registry or is aligned with an inner portion 1542 of a bottom edge 1544 of the interior surface 1510 of bore 1502 which extends through the first subregion 1594 of the peripheral region 1578 of the bushing block 1574 to facilitate flow of at least a portion 1546 of the supply 1516 of molten fiberizable material 1517 toward a portion 1548 of the peripheral region 1540 of the bushing 1534.

While not preferred, the bushing 1434 (shown in FIGS. 14 and 14*a*), can be positioned such that the inner portion 1441 of the top edge 1438 of the sidewall 1436 of the bushing 1434 is off-set with respect to the inner portion 1442 of the bottom edge 1444 of the interior surface 1410 of the bore 1402 extending through the first subregion 1494 of the peripheral region 1478 of the bushing block 1474.

Figure 14B:
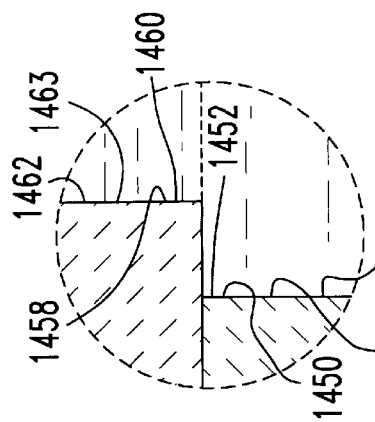
FIG. 14b is an enlarged view of another portion of the apparatus of FIG. 14.
Figure 14A:
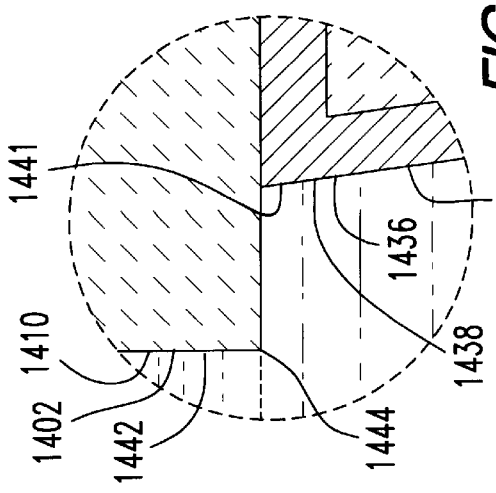
FIG. 14a is an enlarged view of a portion of the apparatus of FIG. 14.

Referring now to FIGS. 15 and 15*b*, the bushing assembly 1514 is preferably positioned such that an inner portion 1550 of a top edge 1552 of the interior surface 1510 of bore 1551 which extends through end region 1556 of bushing block 1574 is positioned in general registry or aligned with the inner portion 1558 of the bottom edge 1560 of the interior surface 1562 of bore 1563 which extends through end region 1564 of flow block 1572 to facilitate the flow of molten fiberizable material 1517 through blocks 1572, 1574 and into bushing 1534. Alternatively, as shown in FIGS. 14 and 14*b*, the inner portion 1450 of the top edge 1452 of the interior surface 1410 of the bore 1454 of the bushing block 1474 can be off-set with respect to the inner portion 1458 of the bottom edge 1460 of the interior surface 1462 of the bore 1463 of the flow block 1428, although this off-set is not preferred.

The operation of a fiber forming apparatus including the flow block and the bushing assembly of the present invention will now be discussed generally. Referring to the preferred embodiment of a fiber forming apparatus shown in FIG. 1, a supply 16 of molten fiberizable material 17 flows from a furnace (not shown) through the forehearth 18, the plurality of bores 48 of the flow block 28, the plurality of bores 102, 103 of the bushing block 74 and into the bushing 34. Streams of molten fiberizable material 17 are then attenuated or drawn through the apertures 134 of the bushing 34 into fibers 11 by an attenuation device 15 discussed below.

After the fibers 11 are drawn through the apertures 134 of the bushing 34 but before winding, a sizing composition can be applied to the surface of the fibers 11 by an applicator 164. Such "sizing" compositions are well known to those skilled in the art and are disclosed in Loewenstein, (3rd. Ed. 1993) at pages 237–289, which are hereby incorporated by reference. After the size is applied, the fibers 11 are gathered together into a bundle by an alignment device 166 and wound into a package 168 by an attenuation device 15, such as a conventional winder 170 comprising a rotatable collet 172. For more information on suitable winding equipment see Loewenstein (3rd. Ed. 1993) at pages 175–194, which are hereby incorporated by reference.

A method according to the present invention for promoting uniformity of the temperature of a molten fiberizable material in a fiber forming apparatus will now be described generally. Referring to FIG. 1, the method comprises an initial step of providing a supply 16 of molten fiberizable material 17 to an insulating refractory flow block 28 comprising a central region 30 and a peripheral region 32. The molten fiberizable material flows through a plurality of bores 48 which extend through the flow block 28. Preferably, the total open volume for flow of molten fiberizable material 17 through the peripheral region 32 of the flow block 28 is greater than the total open volume for flow of molten fiberizable material 17 through the central region 30 of the flow block 32. A first portion 67 of the supply 16 of molten fiberizable material 17 flows through a first bore 64 of the plurality of bores 48 of the flow block 28 concomitantly with a second portion 68 of the supply 16 of molten fiberizable material 17 which flows through a second bore 66 of the plurality of bores 48 of the flow block 28. The molten fiberizable material 17 flows into a bushing assembly 14 from which generally continuous fibers 11 of the molten fiberizable material 17 are attenuated.

Another method according to the present invention for forming generally continuous fibers from a supply of molten fiberizable material will now be discussed generally. Referring to FIG. 15, the method comprises the initial step of providing a supply 1516 of molten fiberizable material 1517 to an insulating refractory bushing block 1574 comprising a central region 1576 and a peripheral region 1578 surrounding the central region 1576. The peripheral region 1578 has one or more bores 1502 extending therethrough to permit the flow of molten fiberizable material 1517 received from the supply 1516 through the bushing block 1574.

A bushing 1534 is aligned to receive the molten fiberizable material 1517 from the bushing block 1574. The bushing 1534 comprises a bottom wall 1532 having a plurality of apertures 1535 to permit the flow of molten fiberizable material 1517 received from the bushing block 1574 therethrough a sidewall 1536 extending generally upwardly from an edge 1537 of the bottom wall 1532, and a peripheral region 1540 adjacent to the sidewall 1536 of the bushing 1534. An inner portion 1541 of a top edge 1538 of the sidewall 1536 of the bushing 1534 is positioned in general registry with the inner portion 1542 of the bottom edge 1544 of the interior surface 1510 of the bore 1502 of the peripheral region 1578 of the bushing block 1574. A portion 1577 of the supply 1516 of molten fiberizable material 1517 flows through the bore 1502 of the peripheral region 1578 of the bushing block 1574 into the bushing 1534 such that flow of at least a portion 1546 of the supply 1516 of molten fiberizable material 1517 toward a portion 1548 of the peripheral region 1540 of the bushing 1534 is facilitated. Generally continuous fibers 1511 of molten fiberizable material 1517 are then attenuated from the apertures 1534 in the bottom wall 1532 of the bushing 1534.

The insulating blocks, bushing assemblies, apparatus and methods of the present invention will now be illustrated by the following specific, non-limiting example:

EXAMPLE

A flow block according to the present invention (shown schematically in FIG. 1) was formed from chromium oxide by machining bores into a pre-formed block The flow block had an overall length of about 1.5 meters (m), a width of about 0.2 m, and a thickness of about 0.05 m.

The flow block comprised a central region and a peripheral region surrounding the central region. The central region was located at the geometric center of the flow block and extended through the thickness of the flow block from the top surface to the bottom surface of the flow block. The central region had a length of about 0.15 m, a width of about 0.2 m and consisted of about ten (10) percent of the total volume of the flow block.

The peripheral region had a pair of opposed first and second end regions. Each end region extended from the top surface to the bottom surface of the flow block and was about 0.68 m long and 0.2 m wide. Each end region consisted of about 45 percent of the total volume of the flow block.

The flow block had eight (8) bores which extended through the peripheral region of the flow block between the top surface and the bottom surface of the flow block to permit the flow of molten glass through the flow block. The total open volumes for flow of the molten glass through the peripheral region, first end region, and the second end region of the flow block were about 0.00253 cubic meters ($m^3$), 0.001269 $m^3$, 0.001252 $m^3$, respectively. The central region had no bores or openings and did not permit flow of molten glass therethrough.

Each of the eight (8) bores had an interior surface which was parallel to a central, longitudinal axis of the bore and had a constant cross-sectional area along the central axis of the bore. The cross-sectional area of the first, second, third, and fourth bores (furthest from the first end of the flow block) of the first end region of the peripheral region of the flow block were about 0.0103 square meters ($m^2$), 0.00293 $m^2$, 0.00332 $m^2$, and 0.00622 $m^2$, respectively. The cross-sectional area of the first, second, third, and fourth bores (furthest from the second end of the flow block) of the second end region were about 0.00912 $m^2$, 0.00293 $m^2$, 0.00370 $m^2$, and 0.00667 $m^2$, respectively.

The bores of the first end region were located such that central axes of the first, second, third and fourth bores were approximately 0.183 m, 0.377 m, 0.503 m, and 0.653 m from the first end of the flow block, respectively. Similarly, the bores of the second end region were located such that the central axes of the first, second, third and fourth bores were approximately 0.171 m, 0.4 m, 0.533 m, and 0.7 m from the second end of the flow block, respectively.

A fiber forming apparatus according to the present invention (also shown in FIGS. 1–3 and 16–17) having the flow block discussed above, an insulating, refractory bushing block and a metal bushing was also fabricated.

The bushing block was formed from zirconium oxide by machining bores into a pre-formed block and had an overall length of about 1.5 m, a width of about 0.2 m, and a thickness of about 0.05 m.

The bushing block comprised a central region and a peripheral region surrounding the central region. The central region was located at the geometric center of the bushing block and extended through the thickness of the bushing block from the top surface to the bottom surface of the bushing block. The central region was about 0.15 m long, about 0.2 m wide and consisted of about ten (10) percent of the total geometric volume of the bushing block.

The peripheral region of the bushing block had a pair of opposed first and second end regions. Each end region extended from the top surface to the bottom surface of the bushing block and was about 0.68 m long and about 0.2 m wide. Each end region consisted of about 45 percent of the total geometric volume of the bushing block.

The bushing block had eight (8) bores that extended through the peripheral region of the block to permit the flow of molten glass received from the flow block therethrough. The bushing block was positioned such that the bores of the bushing block were generally aligned with the bores of the flow block.

The bores of the first end region of the bushing block were located such that the central axes of the first, second, third and fourth bores of the first end region of the peripheral region were approximately 0.183 m, 0.377 m, 0.503 m, and 0.623 m from the first end of the bushing block, respectively. Similarly, the bores of the second end region were located such that the central axes of the first, second, third and fourth bores of the second end region of the peripheral region were approximately 0.171 m, 0.4 m, 0.533 m, and 0.7 m from the second end of the bushing block, respectively.

The total open volume for flow of molten glass through the peripheral region, first end region, and second end region of the bushing block was about 0.00318 $m^3$, 0.0016 $m^3$, 0.00158 $m^3$, respectively. The central region had no bores or openings and did not permit the flow of molten glass therethrough.

A portion of the interior surface of each bore adjacent to the top surface of the bushing block which was generally parallel to the central axis of each respective bore extended downwardly from the top surface toward the bottom surface of the bushing block about 1.3 cm. The remaining, lower portion of the interior surface of each of the bores was tapered to form an angle of about 15° with their respective central axes. Accordingly, the cross-sectional area of each bore at the top surface of the bushing block was less than the cross-sectional area of each bore at the bottom surface of the bushing block.

The cross-sectional area of the first, second, third, and fourth bores at the top surface of the first end region was about 0.0103 $m^2$, 0.00293 $m^2$, 0.00332 $m^2$, and 0.00622 $m^2$, respectively. The cross-sectional area of the first, second, third and fourth bores at the bottom surface of the first end region of the bushing block was about 0.0169 $m^2$, 0.00592 $m^2$, 0.00650 $m^2$, and 0.0109 $m^2$, respectively.

The cross-sectional area of the first, second, third, and fourth bores of the second end region at the top surface of the bushing block was about 0.00912 $m^2$, 0.00293 $m^2$, 0.00370 $m^2$, and 0.00667 $m^2$, respectively. The cross-sectional area of the first, second, third and fourth bores of the second end region at the bottom surface of the bushing block was about 0.0152 $m^2$, 0.00592 $m^2$, 0.00708 $m^2$, and 0.0115 $m^2$, respectively.

The bushing was formed from a platinum alloy having about 10 percent rhodium and consisted of a bottom wall having about 7968 apertures therethrough and four (4) sidewalls.

The sidewall of the bushing was tapered at an angle of about 28° with respect to a central axis of the bushing. An inner portion of the top edge of the sidewall of the bushing was aligned with an inner portion of the bottom edge of the interior surface of the fourth bore of the first end region and an inner portion of the bottom edge of the interior surface of the fourth bore of the second end region.

A fiber forming apparatus comprising the insulating refractory flow block and bushing assembly discussed above was installed in a direct-melt fiber forming operation. The bushing assembly was positioned beneath the flow block such that the bores of the bushing block were generally aligned with the corresponding bores of the flow block, as shown in FIG. 1.

Molten glass was flowed through the flow and bushing blocks and into the bushing such that a portion of the glass was diverted to flow through the peripheral regions of the blocks into the peripheral region of the bushing. It was observed that the uniformity of the temperature of a portion of the glass near the end region of the bottom wall of the bushing was improved as compared to a similar conventional fiber forming apparatus having a single-slot flow block and a single-slot bushing block.

From the foregoing description, it can be seen that the present invention provides insulating flow and bushing blocks, bushing assemblies, fiber forming apparatus, and methods that are useful in promoting uniformity of the temperature and flow velocity of molten fiberizable material in a fiber forming operation. By diverting a portion of the relatively hot molten fiberizable material that flows through the center of a single, elongated slot in a central region of a conventional flow and/or bushing block to one or more bores in a peripheral region of the flow and/or bushing block, the uniformity of the temperature and flow velocity of molten fiberizable material at the tip plate of the bushing is controlled which can increase uniformity of fiber diameters and reduced break-outs during forming of the fibers.

It will be appreciated by those skilled in the art that changes could be made to the embodiments described above without departing from the broad inventive concept thereof. It is understood, therefore, that this invention is not limited to the particular embodiments disclosed, but is intended to cover modifications which are within the spirit and scope of the invention, as defined by the appended claims.

Therefore, we claim:

1. An insulating flow block for controlling flow and promoting uniformity of temperature of molten fiberizable material received from a forehearth supply to a fiber forming apparatus, the flow block having a total volume and being formed from a refractory material and comprising:
   (a) a central region;
   (b) a peripheral region surrounding the central region; and
   (c) a plurality of bores extending between a top surface of the flow block and a bottom surface of the flow block, each bore of the plurality of bores having an interior surface to define a passageway to permit flow of molten fiberizable material through the flow block, wherein the plurality of bores comprise
      (1) a first plurality of bores located within the peripheral region of the flow block that provides a total open volume for flow of molten fiberizable material through the peripheral region of about 5 to about 35 percent of the total volume of the flow block, and
      (2) at least one additional bore located within the central region of the flow block that provides a total open volume for flow of molten fiberizable material through the central region of no greater than about 20 percent of the total volume of the flow block.

2. The flow block according to claim 1, wherein the refractory material is selected from the group consisting of metal oxides, metal nitrides, metal carbides, metal borides and mixtures thereof.

3. The flow block according to claim 1, wherein the plurality of bores comprises from three (3) to about ten (10) bores.

4. The flow block according to claim 1, wherein a passageway of a first bore of the plurality of bores is isolated from a passageway of a second bore of the plurality of bores.

5. The flow block according to claim 1, wherein at least a portion of an interior surface of at least one bore of the plurality of bores is generally parallel to a central axis of the at least one bore.

6. The fiber forming apparatus according to claim 1, wherein at least one bore of the plurality of bores has a cross-section having a general shape selected from the group consisting of circular, elliptical, rectangular and square.

7. The flow block according to claim 1, wherein at least a portion of an interior surface of at least one bore of the plurality of bores is tapered.

8. The flow block according to claim 1, wherein a total open volume for flow of molten fiberizable material through the passageways of the first plurality of bores located in the peripheral region of the flow block is greater than a total open volume for flow of molten fiberizable material through the passageway of the at least one additional bore located in the central region of the flow block.

9. A molten material supply system for use in a fiber forming apparatus, the system comprising:
   (a) a supply of molten fiberizable material;
   (b) a forehearth comprising a bottom wall and a sidewall extending generally upwardly from an edge of the bottom wall to form a reservoir for the supply of molten fiberizable material, the bottom wall having an opening extending therethrough; and
   (c) an insulating flow block formed from refractory material and having a total volume, the insulating flow block being positioned within the opening of the forehearth and comprising
      (1) a central region;
      (2) a peripheral region surrounding the central region; and
      (3) a plurality of bores extending between a top surface of the flow block and a bottom surface of the flow block, each bore of the plurality of bores having an interior surface to define a passageway to permit flow of molten fiberizable material received from the reservoir of the forehearth through the flow block, wherein the plurality of bores comprise
         (i) a first plurality of bores located within the peripheral region of the flow block that provides a total open volume for flow of molten fiberizable material through the first plurality of bores of about 5 to about 35 percent of the total volume of the flow block, and
         (ii) at least one additional bore located within the peripheral region of the flow block that provides a total open volume for flow of molten fiberizable material through the at least one additional bore of no greater than about 20 percent of the total volume of the flow block.

10. The supply system according to claim 9, wherein the refractory material is selected from the group consisting of metal oxides, metal nitrides, metal carbides, metal borides and mixtures thereof.

11. The supply system according to claim 9, wherein the plurality of bores comprises from three (3) to about ten (10) bores.

12. The supply system according to claim 9, wherein a passageway of a first bore of the plurality of bores is isolated from a passageway of a second bore of the plurality of bores.

13. The supply system according to claim 9, wherein a bore of the plurality of bores has a cross-section having a general shape selected from the group consisting of circular, elliptical, rectangular and square.

14. The supply system according to claim 9, wherein a total open volume for flow of molten fiberizable material through the passageways of the first plurality of bores located in the peripheral region of the flow block is greater than a total open volume for flow of molten fiberizable material through the passageway of the at least one additional bore located in the central region of the flow block.

15. The supply system according to claim 9, further comprising a metal bushing positioned beneath the flow block to receive molten fiberizable material from at least one bore of the plurality of bores of the flow block, the bushing comprising:
   (a) a bottom wall having a plurality of apertures to permit flow of molten fiberizable material therethrough, and (b) a sidewall extending generally upwardly from an edge of the bottom wall to form a reservoir for the molten fiberizable material, the sidewall having a top edge positioned adjacent to the bottom surface of the flow block.

16. The supply system according to claim 9, further comprising a bushing block positioned beneath the flow block to receive molten fiberizable material from at least one bore of the plurality of bores of the flow block, the bushing block comprising a top surface positioned adjacent to the bottom surface of the flow block, a bottom surface opposite the top surface, and at least one bore extending therethrough to permit flow of molten fiberizable material received from the at least one bore of the plurality of bores of the flow block through the at least one bore of the bushing block.

17. A fiber forming apparatus for forming generally continuous fibers, the fiber forming apparatus comprising:
 (a) a supply of molten fiberizable material;
 (b) an insulating bushing block formed from a refractory material, the bushing block being positioned adjacent to the supply to receive molten fiberizable material therefrom, the bushing block comprising
  (1) a central region,
  (2) a peripheral region surrounding the central region, and
  (3) a plurality of bores extending between a top surface of the bushing block and a bottom surface of the bushing block, each bore of the plurality of bores having an interior surface to define a passageway to permit flow of molten fiberizable material received from the reservoir of the forehearth through the bushing block, wherein the plurality of bores comprise
   (i) a first plurality of the plurality of bores located within the peripheral region of the bushing block, and
   (ii) at least one additional bore located within the central region of the bushing block,
  and further wherein a total open volume for flow of molten fiberizable material through the first plurality of bores located in the peripheral region of the bushing block is greater than a total open volume for flow of molten fiberizable material through the at least one additional bore located in the central region of the bushing block; and
 (c) a metal bushing positioned to receive molten fiberizable material from the bore of the first subregion of the bushing block, the bushing comprising:
  (1) a bottom wall having a plurality of apertures to permit flow of molten fiberizable material received from the bushing block therethrough;
  (2) a sidewall extending generally upwardly from an edge of the bottom wall to form a reservoir for the supply of molten fiberizable material; and
  (3) a peripheral region adjacent to the sidewall of the bushing, wherein an inner portion of a top edge of the sidewall of the bushing is positioned in general registry with an inner portion of a bottom edge of the interior surface of the bore of the first subregion of the bushing block to facilitate flow of at least a portion of molten fiberizable material toward a portion of the peripheral region of the bushing adjacent to the sidewall of the bushing.

18. The fiber forming apparatus according to claim 17, wherein the bushing block is formed from a refractory material selected from the group consisting of metal oxides, metal nitrides, metal carbides, metal borides and mixtures thereof.

19. The fiber forming apparatus according to claim 17, wherein the at least one additional bore in the central region of the bushing block comprises a plurality of bores extending therethrough.

20. The fiber forming apparatus according to claim 17, wherein the at least one pair of opposed subregions is selected from the group consisting of a pair of end regions and a pair of side regions.

21. The fiber forming apparatus according to claim 20, wherein the at least one air of opposed subregions is a pair of end regions.

22. The fiber forming apparatus according to claim 17, wherein at least one bore of the plurality of bores has a cross-section having a general shape selected from the group consisting of circular, elliptical, rectangular and square.

23. The fiber forming apparatus according to claim 17, wherein at least a portion of the interior surface of at least one bore of the plurality of bores is tapered.

24. The fiber forming apparatus according to claim 17, wherein at least one bore of the plurality of bores has a greater cross-sectional area at the bottom surface of the bushing block than a cross-sectional area at the top surface of the bushing block.

25. The fiber forming apparatus according to claim 17, wherein the peripheral region includes at least one pair of opposed first and second subregions each having at least one bore of the plurality of bores extending therethrough to permit flow of molten fiberizable material received from the supply through the bushing block.

26. The fiber forming apparatus according to claim 25, wherein the first and second subregions have a plurality of bores extending therethrough to permit flow of molten fiberizable material received from the supply through the bushing block.

27. The fiber forming apparatus according to claim 25, wherein a total open volume for flow of molten fiberizable material through the passageway of the at least one bore located in the first subregion is greater than a total open volume for flow of molten fiberizable material through a passageway of the at least one bore located in the second subregion.

28. An insulating flow block for controlling flow and promoting uniformity of temperature of molten fiberizable material received from a forehearth supply to a fiber forming apparatus, the flow block having a total volume and being formed from a refractory material and comprising:
 (a) a central region;
 (b) a peripheral region surrounding the central region; and
 (c) a plurality of bores extending between a top surface of the flow block and a bottom surface of the flow block and located only within the peripheral region, each bore of the plurality of bores having an interior surface to define a passageway to permit flow of molten fiberizable material through the flow block, wherein the plurality of bores comprise a total open volume for flow of molten fiberizable material through the peripheral region of about 5 to about 35 percent of the total volume of the flow block.

* * * * *